(12) United States Patent
Clark et al.

(10) Patent No.: US 7,146,057 B2
(45) Date of Patent: Dec. 5, 2006

(54) SYSTEM AND METHOD FOR IMAGE ANALYSIS USING A CHAINCODE

(75) Inventors: Walter D. Clark, Fullerton, CA (US); Richard L. Hoffman, Rancho Palos Verdes, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 775 days.

(21) Appl. No.: 10/193,544

(22) Filed: Jul. 10, 2002

(65) Prior Publication Data

US 2004/0008890 A1    Jan. 15, 2004

(51) Int. Cl.
G06K 9/48    (2006.01)
G06K 9/30    (2006.01)
G06K 9/36    (2006.01)
G06K 9/00    (2006.01)

(52) U.S. Cl. .................. 382/242; 382/103; 382/197; 382/316

(58) Field of Classification Search .............. 382/197
See application file for complete search history.

(56) References Cited

U.S. PATENT DOCUMENTS

| | | | |
|---|---|---|---|
| 4,323,880 A * | 4/1982 | Lucas | 382/170 |
| 4,499,598 A | 2/1985 | Chittineni | |
| 4,628,532 A | 12/1986 | Stone et al. | |
| 4,712,248 A | 12/1987 | Hongo | |
| 4,731,858 A | 3/1988 | Grasmueller et al. | |
| 4,783,828 A * | 11/1988 | Sadjadi | 382/170 |
| 5,033,099 A | 7/1991 | Yamada et al. | |
| 5,036,544 A | 7/1991 | Sakaue et al. | |
| 5,265,173 A * | 11/1993 | Griffin et al. | 382/103 |
| 5,341,439 A | 8/1994 | Hsu | 382/28 |
| 5,479,526 A | 12/1995 | Benton et al. | |
| 5,604,822 A | 2/1997 | Pearson et al. | 382/199 |
| 5,644,386 A | 7/1997 | Jenkins et al. | 356/4.01 |
| 5,809,171 A | 9/1998 | Neff et al. | 382/209 |
| 5,825,922 A | 10/1998 | Pearson et al. | 382/199 |
| 5,867,118 A | 2/1999 | McCoy et al. | 342/90 |
| 5,937,078 A | 8/1999 | Hyland et al. | 382/103 |

(Continued)

FOREIGN PATENT DOCUMENTS

EP    0 505 077    9/1992

(Continued)

OTHER PUBLICATIONS

D. Juvin et al., "ANIMA (Analyses of Images) A Quasi Real Time System," Proceedings- IEEE Computer Society Conference on Pattern Recognition and Image Processing, 1982, pp. 358-361 & 598.

(Continued)

Primary Examiner—Joseph Manguso
Assistant Examiner—Kathleen Yuan
(74) Attorney, Agent, or Firm—Fulbright & Jaworski LLP

(57) ABSTRACT

The present invention includes a method for analyzing an image to screen for target candidates wherein an edge-follower detects straight segments within a plurality of longer edges and detects also from the longer edges, contours that go around areas that are the right size. The invention also contemplates starting the edge-follower from seeds on the image and terminating the edge-following process if the edge meanders too much to ever become an acceptable contour. In accordance with another embodiment, the straight segments can be further screened by measuring the gradient direction and then noting the deviation from the mean of those direction values. The highly straight edges thus found, in confluence with each other, or near a correct size contour define likely candidates.

27 Claims, 13 Drawing Sheets

U.S. PATENT DOCUMENTS

| | | | |
|---|---|---|---|
| 5,943,442 A | 8/1999 | Tanaka et al. | 382/216 |
| 5,978,507 A | 11/1999 | Shackleton et al. | 382/195 |
| 5,982,930 A | 11/1999 | Neff et al. | 382/209 |
| 6,005,978 A * | 12/1999 | Garakani | 382/218 |
| 6,072,889 A | 6/2000 | Deaett et al. | 382/103 |
| 6,084,989 A | 7/2000 | Eppler | 382/293 |
| 6,094,508 A | 7/2000 | Acharya et al. | 382/199 |
| 6,118,886 A | 9/2000 | Baumgart et al. | 382/103 |
| 6,141,433 A | 10/2000 | Moed et al. | 382/103 |
| 6,141,460 A | 10/2000 | Amer et al. | 382/257 |
| 6,154,567 A | 11/2000 | McGarry | 382/219 |
| 6,173,066 B1 | 1/2001 | Peurach et al. | 382/103 |
| 6,178,264 B1 * | 1/2001 | Kamatani | 382/199 |
| 6,181,815 B1 | 1/2001 | Marugame | 382/154 |
| 6,195,459 B1 | 2/2001 | Zhu | 382/176 |
| 6,411,733 B1 * | 6/2002 | Saund | 382/190 |
| 6,748,110 B1 * | 6/2004 | Wallack | 382/173 |
| 6,954,550 B1 * | 10/2005 | Fujieda | 382/199 |
| 2003/0118245 A1 | 6/2003 | Yaroskavsky et al. | |

FOREIGN PATENT DOCUMENTS

| | | |
|---|---|---|
| GB | 1157991 | 7/1996 |
| WO | WO 90/15400 | 12/1990 |
| WO | WO 99/23444 | 5/1999 |
| WO | WO 02/29712 | 4/2002 |

OTHER PUBLICATIONS

H. Freeman, "On the Encoding of Arbitrary Geometric Configurations," IRE Transactions on Electronic Computers, New York University, New York, US, Aug. 1960, pp. 260-268.

L. O'Gorman, "Primitives Chain Code," AT&T Bell Laboratories, New Jersey, IEEE, 1988, pp. 792-795.

A. Rosenfeld et al., "Digital Picture Processing," Academic Press, New York, 1981, pp. 132-139 (XP-003208718).

Lewis G. Minor, "Application of Pattern Recognition and Image Processing Techniques to Lock-on-After-Launch Missile Technology," US Army Missile Laboratory, Alabama, Apr. 5, 1981, pp. 460-464.

United States Patent Application entitled *System and Method for Analyzing a Contour of an Image by Applying a Sobel Operator Thereto*, by Clark, et al., filed Jul. 10, 2002.

United States Patent Application entitled *System and Method for Template Matching of Candidates within a Two-Dimensional Image*, by Clark, et al., filed Jul. 10, 2002.

European Search Report issued for EP 03 25 2990, dated Dec. 15, 2004, 3 pages.

Rummel, P., A Model-Based Visual Sensor System for Complex Industrial Scenes, Siemens Forsch-u, Entwickl-Ber. Bd 13, No. 3, 1984, pp. 151-154.

Belongie S. et al., "Matching Shapes," Department of Electrical Engineering and Computer Sciences; University of California, 2001, pp. 454-461.

"High Accuracy Feature Extraction Using Chain Goce in GRQY-Value Images," IBM Technical Disclosure Bulletin, vol. 31, No. 1, Jun. 1988, New York, pp. 268-269.

Jahne B., "Digitale Bildverarbeitung, Kanten," Springer-Verlag, 2001, pp. 333-356.

D.C. Douglas Hung et al., "Subpixel Edge Estimation Using Geometrical Edge Models With Noise Miniaturization," Proceedings of the IEEE Southwest Symposium, Dallas, USA, Apr. 1994, pp. 112-117.

Joon-Woong Lee et al., "Extraction of Line Features in a Noisy Image," Pattern Recognition Society, Elsevier Science Ltd., Great Britain, 1997, pp. 1651-1660.

European Search Report issued for EP 03 25 3013, dated Dec. 10, 2004.

* cited by examiner

SYSTEM AND METHOD FOR IMAGE ANALYSIS USING A CHAINCODE

RELATED PATENT APPLICATIONS

This application is being filed concurrently with patent applications entitled System and Method for Analyzing a Contour of an Image by Applying a Sobel Operator Thereto Ser. No. 10/193,413 and System and Method for Template Matching of Candidates within a Two-Dimensional Image Ser. No. 10/193,019.

TECHNICAL FIELD OF THE INVENTION

The present invention relates in general to the analysis of two-dimensional images and more particularly, to a system and method for detecting a region(s) of interest within an image using a chaincode.

BACKGROUND OF THE INVENTION

Target recognition involves the analysis of two-dimensional images in order to identify targets. Many systems and methods incorporate a three-step process in which: (i) a very fast pre-screener is used to identify regions of interest or target candidates within an image; (ii) a slower intermediate discriminator evaluates each region of interest in more detail, further reducing the number of candidates; and (iii) finally the most careful process positively identifies targets a process which sometimes includes locating the most vulnerable spot within the target.

Two dimensional sensors such as video or Forward-Looking Infrared Sensors (FLIRS) are used to analyze a tremendous amount of incoming information in their search to correctly identify a potential target. With data refresh rates of thirty frames per second or higher, the target detection system must rapidly locate any targets observed by the sensor.

The first detection phase evaluates every pixel in the scene, and should avoid any errors of omission. Accordingly, during the first detection phase there will be many "false alarms." One method used in this first phase is to find warm objects of about the same size as the expected target. This works very well with older FLIRS which were blind to the direct radiation from the sun. Only after the sunlight is turned into heat is it visible. Because of the fundamental resolution limitation of these wavelengths, practical FLIR apertures were between six and twelve inches in diameter.

In order to attain an image with a resolution sufficient to identify tactical targets with sensors carried by small diameter rockets or sub-munitions, the magnitude of the FLIRS aperture becomes the dominant design constraint. For diameter constrained applications using the shorter wavelength FLIR is the only solution.

Short wavelength FLIRS using traditional blob-finding algorithms for the pre-screener will have difficulty detecting a target because the scene will often be dominated by the reflected infrared energy from the sun, rather than the heat internally generated by the target itself. Infrared energy from the sunlight adds contrast detail in what would be uniform black background using the longer wavelength of the older FLIRS. In addition, sunlight adds contrast detail within the target. This change in wavelength to accommodate smaller diameter sensors will increase the number of regions that must be analyzed further, and include more "false alarms" in the pre-screener phase.

Subsequent detection phases are typically much slower, however, and drain substantial processing resources. The increased number of potential targets with shorter wavelength FLIRS using blob finding algorithms means the efficiency of the target detection system may be greatly reduced. In a worst case situation this diminished efficiency can mean that the system fails to detect a real target because it will be forced to drop frames to keep up with the data flow.

SUMMARY OF THE INVENTION

The present invention provides a system and method for analyzing an image that substantially eliminates or greatly reduces disadvantages and problems associated with previous systems and methods. More specifically, a particular method described herein uses a chaincode to identify edges of an image that contribute to particular regions of interest. The size of contours, the degree of straightness of certain edge-segments, and a confluence of these two are used to pre-screen the image for further evaluation.

In accordance with a particular embodiment of the present invention, a method for analyzing an image includes selecting a location within an image to initiate a chaincode. A chaincode being operable to follow a path defined, at least in part, by a plurality of adjacent pixels having approximately equal changes in brightness therebetween, is initiated at the location. The method also includes measuring direction changes of the path until a condition is identified that disqualifies further travel, before the chaincode returns to the location.

In accordance with another embodiment of the present invention, the condition that disqualifies further travel is excessive meandering. This embodiment includes calculating meander values corresponding to successive positions of the chaincode as the chaincode follows the path. The meander values are related to the proportion of edge pixels traversed by the chaincode, to a straight-line distance traveled by the chaincode. The chaincode may be terminated if one of the meander values exceeds a predetermined threshold meander value.

In accordance with yet another embodiment of the present invention, the chaincode may be terminated if the straight-line displacement exceeds a predetermined threshold length before starting to head back toward the initial point.

In accordance with still another embodiment of the present invention, the path comprises limits of extent which extend generally parallel to a reference axis, and a second limit of extent which extends generally perpendicular to the reference axis. An approximate area of a contour defined, at least in part, by at least two limits of extent may be calculated, using positions of the limits of extent and the initial point.

Technical advantages particular embodiments of the present invention include a method for identifying regions of interest of an image, by initiating chaincodes at a plurality of edge points, such that fewer regions are handed off to the more complicated process that follow. Any chaincode which meanders too much is terminated, in order to avoid evaluating an edge that is not likely to later be identified as a target candidate. In this manner, true target candidates are identified more quickly, and processing resources are preserved.

Another technical advantage of particular embodiments of the present invention is the ability to terminate any chaincode that includes an extent that exceeds a predetermined maximum size. This also avoids the further evaluation of edges that are not likely associated with a target candidate. Accordingly, target candidates are identified more quickly and efficiently, similar to the embodiment described above.

Still another technical advantage of particular embodiments of the present invention include the ability to approximate the area of an object, using measurements from three limits of extent of a chaincode, or two limits of extent and the initial point to at least partially define the shape of the object. In this manner, chaincodes that define an area that is too large, or too small, can be disqualified from further consideration. Furthermore, in accordance with particular embodiments, generally straight edges that are within a "right-sized" area can be identified.

Still another technical advantage of the particular embodiments of the present invention includes the ability to store edge paths that are within forty-five degrees of straight. If the path walks off of straight after that, the chaincode is allowed to continue until stopped by the rules of extent (displacement from initial point and displacement divided by pixel count) on the chance that the edge will come back around and be part of a correct size object. Those edges that meet the minimum condition of straightness (even if part of a larger curving line) will be further analyzed in later processing. This later processing is slower but more precise at determining the straightness of an edge.

Other technical advantages may be readily ascertainable by those skilled in the art from the following figures, description, and claims. Moreover, while specific advantages have been enumerated above, various embodiments may include all, some or none of the enumerated advantages.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 3b illustrates a chaincode which corresponds to a portion of the chaincode of FIG. 3a;

DETAILED DESCRIPTION OF THE INVENTION

Figure 1A:
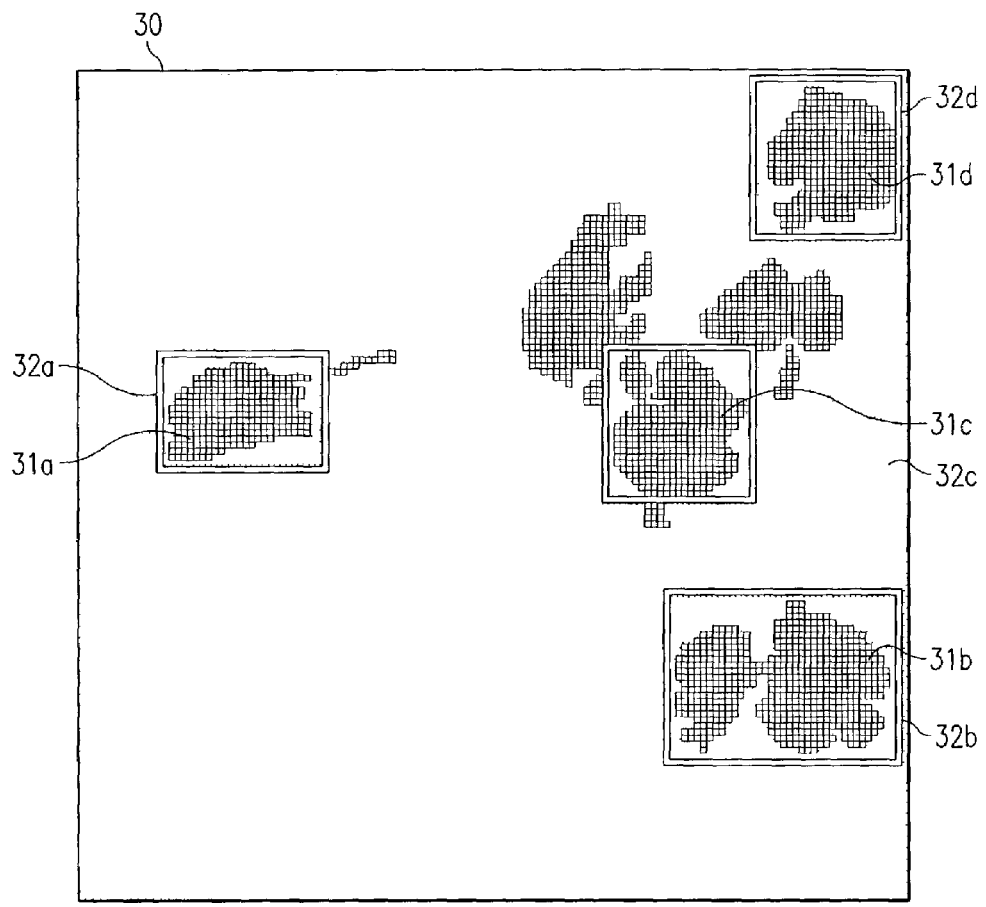
FIG. 1A illustrates a long wavelength FLIR in sunlight, wherein the only light available comes from the warmth of the objects themselves, to be analyzed in accordance with a particular embodiment of the present invention.

Systems and methods which collectively accomplish target recognition of a two dimensional image are described herein, each of which may be generally classified into one of three phases of target recognition: (i) pre-screener; (ii) intermediate discriminator; and (iii) target identification. During the pre-screener phase, a two-dimensional image is analyzed in order to identify a plurality of edges, using a chaincode. Initially, edge points are identified by measuring the change in brightness between adjacent pixels of the image. If a particular edge point exceeds a predetermined threshold contrast, a chaincode is initiated that tracks the contour of the edge. There are hundreds of tracks that are started on the image in a grid of seed points. The idea is to locate and then follow all edges that have a certain amount of straightness and to follow all contours which seem to encircle something of about the right size. The chaincode continues to track the edge but terminates its journey if the edge is too short, meanders too much, and/or extends too far in one direction before turning around. These rules of extent are followed while still using the chaincode to note all edges that are straight beyond a certain minimum distance.

All relatively straight edges having a length within an acceptable range are retraced in order to obtain their Sobel-chaincode value. Sobel-bandwidths are calculated and all these edges are sorted by degree of straightness. Any area where there is a confluence of highly straight edges is marked as a likely position of a target candidate (the noted location is the centroid of the confluence of straight lines). It is fast and easy to find a gathering of straight edges, later processing will determine if they are parallel or random. It is sufficient for pre-screening to use straightness as an indication of something not natural. One later process might be a Sobel-chaincode based template matcher which can be initiated to create a more complete description of the object. The systems and methods used to accomplish the phases referred to above will be described below, in more detail.

PHASE I: Pre-Screener

In accordance with a particular embodiment of the present invention, the above-described method may incorporate a preliminary screener within a target detection system. A screener is to be distinguished from other feature detectors in that a screener evaluates practically every pixel in an image, which means it must be a very fast process. In addition, a screener must avoid errors of omission, which means many target candidates detected by the screener will not actually be valid targets (i.e., there will be many "false alarms").

Many target recognition systems rely upon a pre-screener which identifies "blobs" (e.g. areas, or regions) having generally uniform brightness, that are within a predefined range of sizes. Such systems generally measure the area of the blobs, in order to determine whether or not to evaluate the blob further, and may be referred to herein as "blob-based" screeners. In order to identify targets using sensors carried by small diameter rockets or sub-munitions, short wavelengths FLIRS are used and at those wavelengths, images resemble television images when the sun is out. (At night these FLIRS show the target as blobs against a dark background just like the older FLIRS do all the time.) The contrast detail in such an image would overwhelm blob-based screeners.

The pre-screener of the present invention evaluates edges rather than blobs. (An edge is a section of a contour defined generally by following brightness contrasts between adjacent points of the image.) To make the process faster, and more efficient, edges are disregarded (no longer followed) if they deviate from certain rules: (i) length of the edge (too short or too long); (ii) crookedness of the edge (meanders too much); and/or (iii) the edge extends too far without "turning." The screener described herein may be referred to as an "edge-based" screener.

The edge-based screener of the present invention looks for edges with particular characteristics, such as extent, straightness, and/or contour (e.g. shape) within an image. The contour should be somewhat closed, have the proper extent up-down and left-right, while at the same time satisfying a criterion for not meandering too much. Edge-based screeners may be particularly useful for short-wave FLIR images, where the scene is dominated by the reflected infrared energy from the sun, rather than the heat internally generated by the target itself.

FIG. 1A illustrates a long wavelength FLIR image 30 having a plurality of regions 31*a*–31*d* of rather uniform patches. Regions 31*a*–31*d* have been highlighted by adding rectangular FIGS. 32*a*–32*d* surrounding regions 31*a*–31*d*, for illustrative purposes only (i.e., rectangular FIGS. 32*a*–32*d* are not part of the image recorded by the FLIR). Regions 31*a*–31*d* are well suited for detection using the "blob-finding" algorithm referred to in a previous paragraph.

Figure 1B:
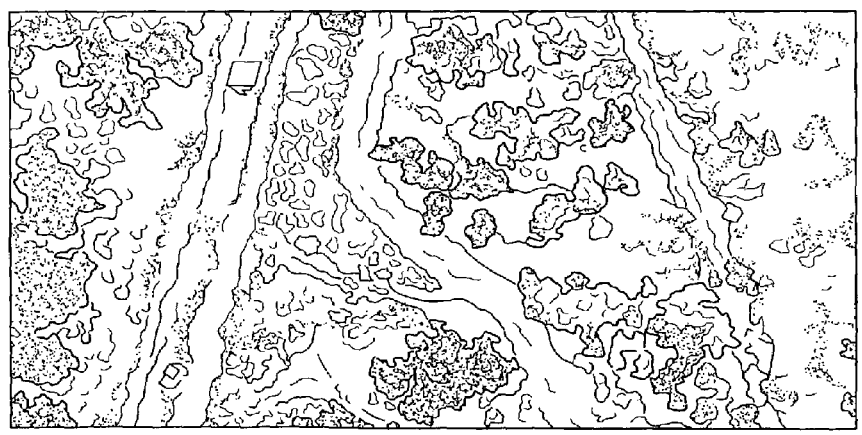
FIG. 1B illustrates a short-wavelength FLIR image in sunlight, wherein the image is dominated by reflected light, to be analyzed in accordance with a particular embodiment of the present invention.

FIG. 1B shows a short wavelength FLIR image. This image shows that the internal heat of the target is the rather small engine compartment. Contrast created by reflected light creates detail within the target and many more patches of contrast in the background. A gate type, or blob detector would have a difficult time with this.

Figure 2:
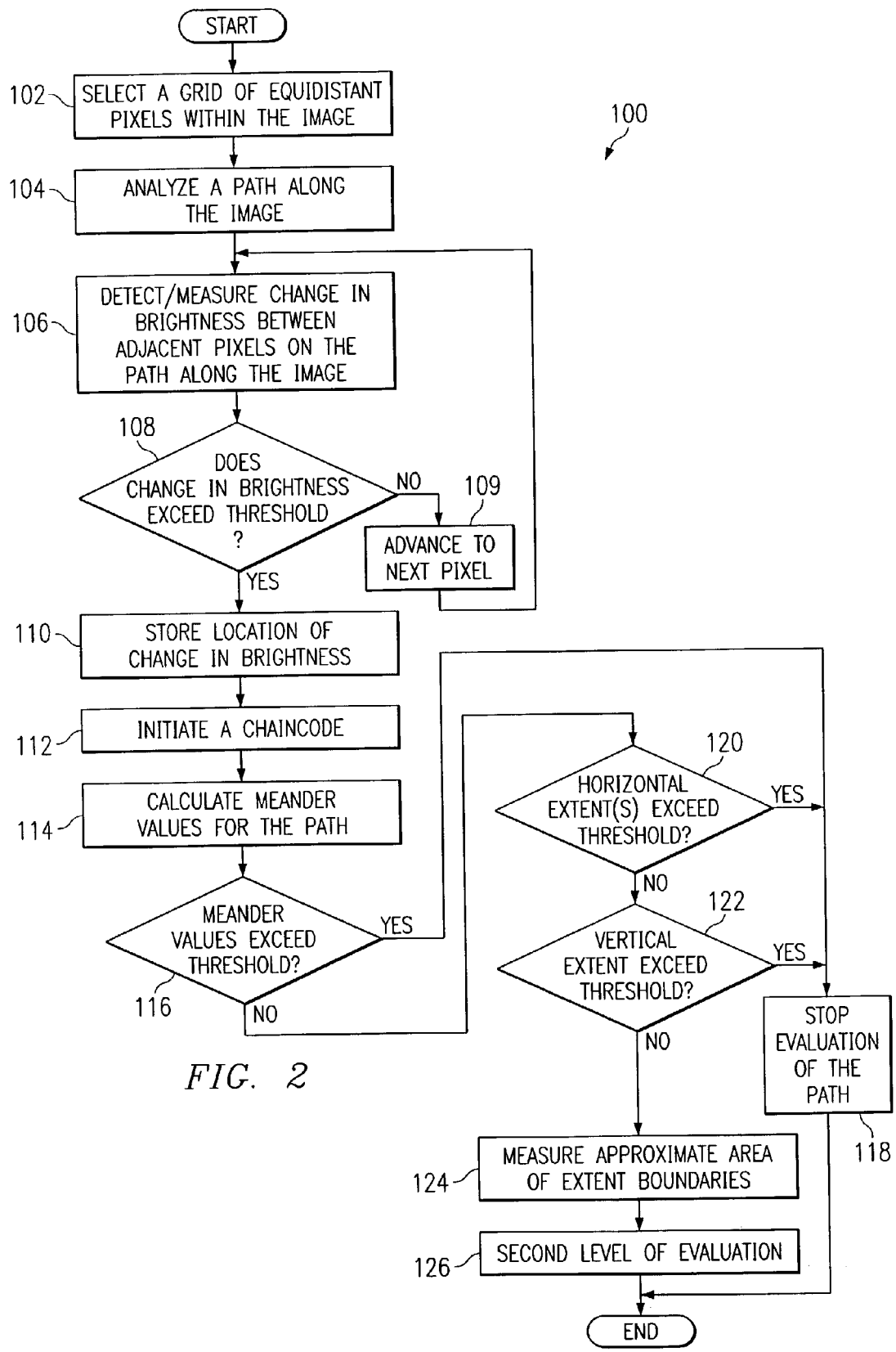
FIG. 2 illustrates a method for pre-screening an image in accordance with a particular embodiment of the present invention.

Referring now to block diagram of FIG. 2, there is illustrated a method 100 of detecting a region of interest within a two-dimensional image, in accordance with a particular embodiment of the present invention. The method 100 may be used as an aid for the identification of targets in the images of two-dimensional sensors such as video or Forward-Looking Infrared (FLIR) sensors. For example, the method of FIG. 2 may be used to detect regions of interest within image 30 of FIGS. 1B and 1A.

The method 100 begins with step 102, wherein a number of pixels, or "seed points," within the image are selected as starting points for evaluation of the image. In a particular embodiment, such pixels are selected in order to form a grid of pixels that are equidistantly spaced across the entire image. The seed points may be spaced approximately one-half of the width of a typical expected target. Other pixel selections for starting points may be also appropriate, however, and these are also envisioned to be within the scope of the present invention.

At step 104, beginning at each seed point, horizontal and vertical linear paths along the image are analyzed in order to identify pixels along the path which exceed a predetermined contrast and have the highest contrast with respect to others in that short path. Although linear paths are contemplated in the method of FIG. 2, other path configurations may be used within the spirit of the present invention. The analysis of the path includes the detection and measurement of any change in brightness between adjacent pixels along the path, as indicated at step 106. The location of the most vivid change in brightness above a certain minimum will be the initial point for the chaincode follower to start on. (After the chaincode follows that edge to its termination, the analysis of the seed path continues until the path reaches the next seed point of the grid.) In accordance with a particular embodiment of the present invention, two perpendicular linear paths are analyzed with regard to each seed point. For example, horizontal and vertical paths may be analyzed, each initiating at the seed point. Therefore, an imaginary square-patterned grid is formed upon the two-dimensional image, in order to identify all edges having a change in brightness that exceed a threshold value. In practice, analysis of a horizontal path will be more likely to detect vertical edges, while analysis of a vertical path will be more likely to detect horizontal edges. There will be hundreds of seed points in the grid, and most will yield no initial points. Most of those initial points will be of edges that will go nowhere. Note, however, that the number of pixels visited is still a much smaller number that must be visited with the traditional blob-finding method, which must evaluate each pixel on the image many times.

For each change in brightness detected at step 106, the change in brightness is compared with a threshold brightness value at step 108, to determine whether or not the change in brightness exceeds the threshold brightness value. The threshold brightness value is a predetermined value that may be used to set a sensitivity of the screener. A lower threshold value represents greater sensitivity of the pre-screener in which more edges are selected for further evaluation. If the measured change in brightness does not exceed the threshold brightness value, the method advances to the next pixel for evaluation, at step 109. However, if the change in brightness does exceed the threshold value, the location of the change in brightness is stored, at step 110 as the initial point of an edge.

Often the targets that a detection system will seek to detect are man-made objects. One way to distinguish man-made objects from their surroundings is to look for straight edges, because truly straight edges rarely exist in nature. Looking for straight edges, therefore, is one way to detect a valid target. Blob-based screeners do not adequately take advantage of this phenomenon.

At step 112, a chaincode follower is initiated at or near the initial point. A chaincode is a computer program operable to follow an edge of a fixed threshold characteristic. In accordance with a particular embodiment of the present invention, the chaincode is a five-line program that can follow an edge of a fixed threshold contrast between adjacent pixels. The chaincode is essentially told to watch for a certain difference between adjacent pixels, and in one embodiment of the present invention it will follow a path that keeps a brighter region on one side and a darker region on the other.

In accordance with a particular embodiment, the chaincode comprises an edge follower that moves along an edge by sensing the brightness of the pixels around the point previously found. The sending of the neighboring pixels is done in a rotary fashion. The first pixel (in rotation) that meets some criterion becomes the next point on the edge. If the criterion is "greater than a certain brightness value," consecutive steps create a path that keeps a dark region on one side and a lighter region on the other.

Figure 3A:
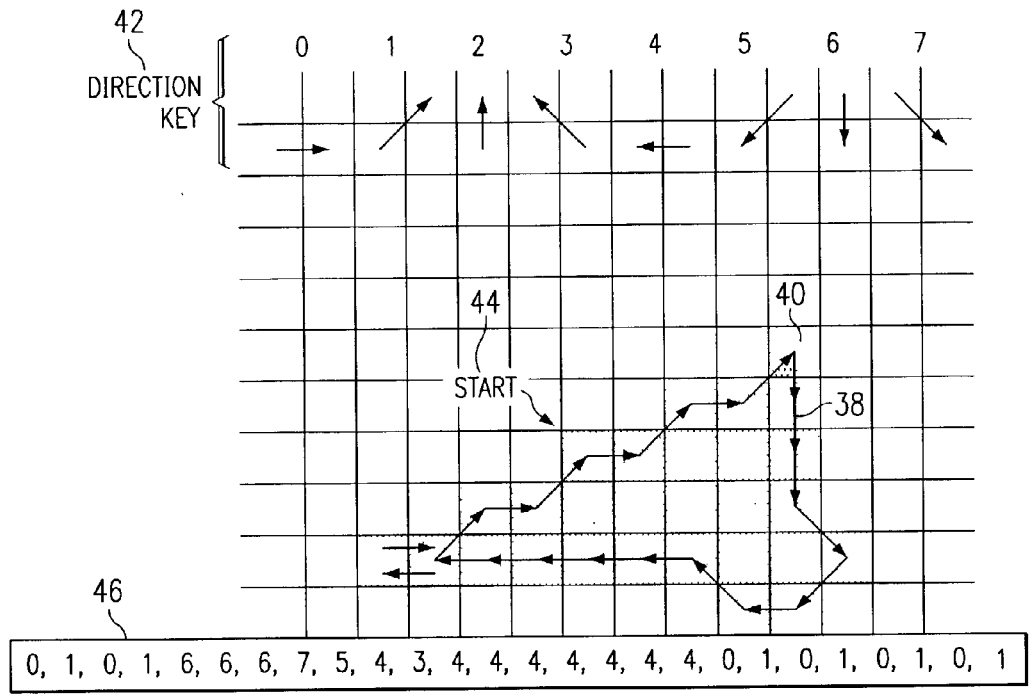
FIG. 3a illustrates a path chaincode, and the direction key used to track direction changes, in accordance with a particular embodiment of the present invention.

For example, FIG. 3A illustrates the results of a chaincode 38 tracking a contour 40. The chaincode identifies directional movement by one of eight directions identified in a direction key 42. The starting point 44 of the chaincode is identified in this figure with a directional arrow. Each contour 40 identified in an image has an identity that can be described using the coordinates of starting point 44, and an array 46 of directional movements derived from direction key 42. In a traditional application of the chaincode, a chaincode is complete when it returns to starting point 44 (thereby forming a closed loop).

Figure 3B:
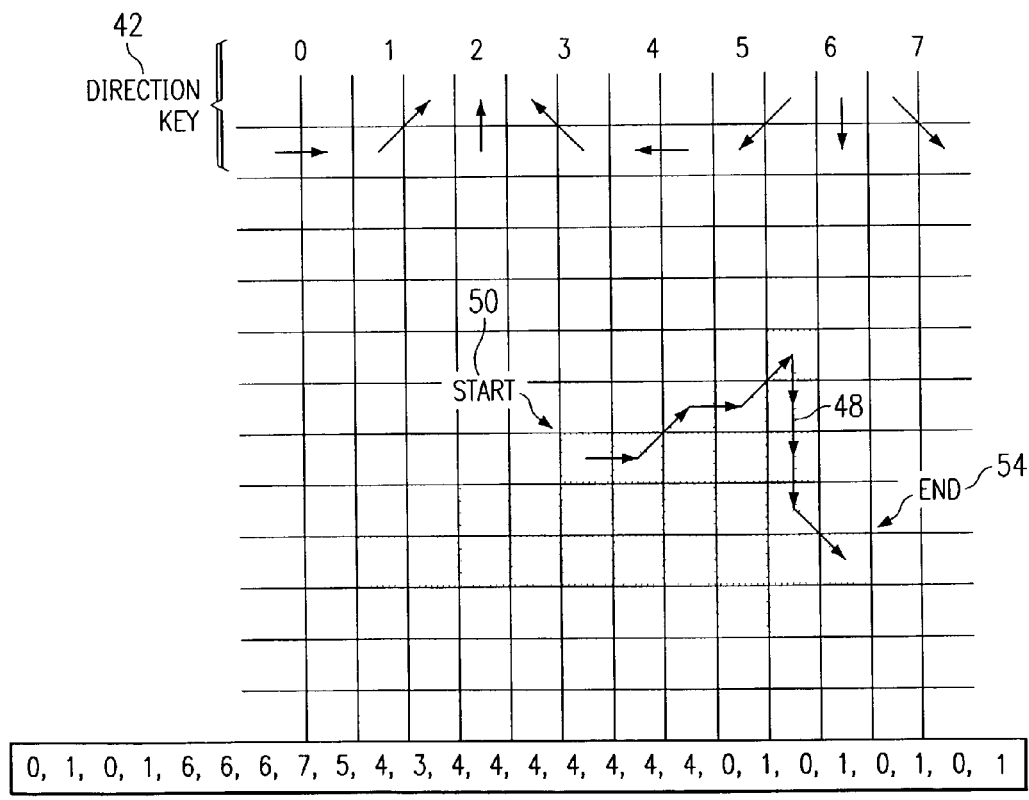

In accordance with the present invention, every significant edge of image 30 (FIG. 1) is followed and it is anticipated that very few will return to the original starting point (i.e. very few will define a "closed" loop). For example, FIG. 3B illustrates a chaincode 48 that does not return to its original starting point. Instead, chaincode 48 has a start point 50 and an array 52 that describes all directional changes between start point 50 and end point 54. It should also be recognized that a chaincode of the present invention may extend beyond the start point, and continue on until terminated by some other mechanism.

The chaincode is referred to as such because only the first edge point (starting point) is known uniquely. All other points take their position from the previous numbers in the chain (array). A chaincode is not an image or a model. Instead, the chaincode is a list of instructions, including a starting point and an array of directions. In a sense, a chaincode is similar to a transform in that a process is required to (re-) create it. Furthermore, edges defined by a chaincode are unique; they each include a starting point, an ending point, and can be given names (labels) and referred to again without searching for it in the image. The chaincode is like a record. The five lines of code that is the edge follower is the recording device and is operable to record the path of the contour. A similar short program could be used to play it back to recreate that path.

The chaincode will continue to track and record the edge until a termination condition is reached. For example, the chaincode will follow the edge of the threshold slavishly, even if it must turn around a single pixel and come back to itself. This occurrence, referred to as a "singularity," is rare, but it does occur. Upon detecting a singularity method 100 will skip out of that point in the last good direction and proceed to the next change in brightness. In operation, the chaincode is extremely fast. Other termination conditions will be described later, in more detail.

A chaincode-follower can also function as a feature extractor, in that it extracts features from a two-dimensional image. A feature extractor is an algorithm which gives a number to a particular image characteristic. Features include, without limitation, length to width ratio, perimeter, perimeter to area ratio, how straight the straight parts are, how long the straight parts are, etc. Features are the fundamental building blocks of the target recognition industry.

A chaincode pre-screener can easily cover an entire image in a few microseconds with a home computer. But the same processor is used for the slower phase of target recognition, so it is important to efficiently utilize the chaincode follower. It should be stopped if it can be determined that the chaincode is unlikely to detect an edge associated with a valid target candidate. If a particular chaincode is terminated, another chaincode is initiated from the initial point found from the next seed point. However, a running analysis is done on the chains as they are created. Chains that meet certain predefined criteria (length and straightness) are stored, and the best ones are used in a next level of evaluation.

More specifically, and referring again to FIG. 2, after a chaincode is initiated at a pixel where a sufficiently large change in brightness was detected, a plurality of meander values for the path of the chaincode are calculated at step 114. Meander is a measure of how many steps the chaincode has taken in relation to the distance that the path of the chaincode has traveled away from the starting point. If the distance traveled away from the starting point is too small for the number of steps taken, the chaincode is meandering too much and has not located a valid target candidate. At step 116, the calculated meander values for the path of the chaincode are compared with a threshold meander value. If the meander values for the path of the chaincode are greater than the threshold meander value, the method 100 advances to step 118. At step 118, analysis of this chaincode path is terminated, because the path does not indicate an edge of a likely target candidate. If the threshold meander value does not exceed the meander value for the path of the chaincode, however, method 100 proceeds to step 120.

The "meandering-extent" algorithm does double duty. Not only does it discard figures which have sides that meander too much, it also saves process time by stopping any further edge following. Even if the chaincode has found flat spots and a nearly complete figure, eventually the "meandering-extent" algorithm stops it. Excess meandering, however, is more often found right away. This makes the "meandering-extent" algorithm the primary method for speeding up the pre-screener process. It eliminates following edges that aren't getting anywhere or wander off in one direction longer than any one side of a target can possibly be.

At steps 120 and 124, the length of the edges that define a contour, and the shape of the contour defined by the edges are evaluated, in order to determine the likelihood that the contour defines, at least in part, a potential target (target candidate). As noted above, the edge finding algorithm identifies edges that include a minimum threshold contrast (change in brightness between points). An edge which stops going away from its initial point in one direction (say vertically) and moves away from the initial point horizontally will, at least in part, be describing a contour. As used herein, the term contour may be used to describe a completely enclosed region, or a partially enclosed region within an image. It is expected that a true target will be an object capable of being defined by an enclosed contour. However, due to imperfections in technology, lighting (e.g., too much/ not enough light), reflections, and/or obstructions from man made or natural objects, the edges may cooperate to define a contour that does not extend entirely around the object. Therefore, partial as well as complete contours that are identified are analyzed to determine the likelihood that they define, either in whole or in part, an object that may be a target.

While the chaincode follower is gathering data about flatness of edges in the image, there is a function which notes how the chaincode grows in extent, either up/down or left/right. The left/right "limit of extent" of the chaincode is the distance the chaincode travels before turning up or down. Similarly, the up/down limit of extent of the chaincode is approximately the distance the chaincode travels before turning left or right. Up, down, left and right are used with respect to a coordinate system having two orthogonal directions. Other designations or orientations may be used within the spirit and scope of the invention.

When a chaincode is initiated at an initial point between seeds, that starting point is the default origin for all extents of that contour. As the chaincode meanders, up and to the right for example, the right and top extents are changing (growing) but the bottom and left extents are still the default extents defined by the starting point. When the chaincode follower turns and begins to return, the maximum for the upper and right extents are defined, and no longer growing in that direction. Eventually, it may pass one of the default extents (defined by the initial point) where it starts growing again. If it passes the left default extent, the left extent is pushed out further. When it stops moving to the left, there are three extents, and one default (the starting point). These three extents can be used to approximate the area of the contour. In practice, it has been demonstrated that waiting for the meandering to form a fourth extent adds very little to the probability of identifying a candidate. Two limits of extent and the initial point is the minimum however.

An extent refers to the distance from the initial point out to the growing portion of the chaincode with respect to the x and y axes. The limit of extent is where it no longer increases in that direction. Therefore, a rectangular object would have four limits of extent. In practice, however, it is difficult to identify, or record perfectly rectangular objects lined up with the x and y axes. Measurement of the extents of the chaincode is allowed some slack (margin of error). However, once the movement up or down exceeds that slack, the program considers that to be the end of the limit of left/right, or up/down extent of the object.

Accordingly, while the program is tracking the path of the chaincode, the left-right and up-down limits of extent of the chaincode determines its approximate size. At step 120, a horizontal size threshold is compared with the horizontal limits of extent of the contour. If a horizontal limit of extent of the path of the chaincode is greater than a horizontal size threshold, method 100 advances to step 118, where evaluation of this path of the chaincode is stopped. If however, it is not greater than a horizontal size threshold, method 100 advances to step 122. At step 122, a vertical size threshold is compared with the vertical limit of extent(s) measured along the path of the chaincode. If it is greater than a vertical size threshold, method 100 advances to step 118, where evaluation of this path of the chaincode is stopped. If it is not greater than a vertical size threshold, method 100 advances to step 126.

In the illustrated embodiment, the horizontal limits of extent(s) of the path of the chaincode are evaluated first. Only if the horizontal limits of extent(s) are within an acceptable range are the vertical extents analyzed further. However, in alternative embodiments, each of the vertical and horizontal limits of extents may be analyzed to determine an approximate area of a contour. Alternatively, vertical limits of extents may be analyzed first, and analysis of the horizontal limits of extents may depend upon the results of the vertical analysis.

The teachings of the present invention may also be used to approximate the area of an object using partial or complete edges and/or contours that define only a portion of the object. As described above, while the chaincode gathers data about an edge, a processing function is operable to measure how the chaincode grows in extent (left/right and/or up/down). One or more edges may be used to calculate an approximate area of the object, by calculating the approximate area defined by the incomplete contour of the object. Alternatively, the "missing" portions of the contour may be extrapolated from the portions that were identified using the edge-based screener. Therefore, at step 124, the approximate area of a contour at least partially bounded by the path of the chaincode is measured. In this context, contour generally refers to an area for which the path of the chaincode forms part of the border of that area.

Chaincodes have been used in the past to determine the area of a figure. In fact, a chaincode may be the fastest way to determine the exact area of a figure. In accordance with the present invention, an approximate area of an incomplete (e.g., three sided, "open" figure) may be determined and is faster yet. This is accomplished by measuring the left-right, and up-down limits of extents of a contour, and relating these extents to the number of edge pixels.

Such data may also be used to identify blobs which appear in an image, that may be of approximately the right size to correspond to a target candidate. In the illustrated embodiment, a blob is the right size to constitute a target if three limits of extent and the starting point are found that are within a predetermined range of sizes (neither too big nor too small). In reality, four limits of extent define a blob. However, experience has shown that an algorithm used to detect blobs should be more forgiving. Using three limits of extent instead of four will identify man-made objects of approximately the right size that are at least partially obscured due to "noise" in the image, or overlap with other man-made or natural objects (e.g., trees). Requiring four extents to identify a potential target would mean that some actual targets would be missed.

An acceptable blob may comprise either the horizontal limit of extent of the chaincode within a horizontal size limit in addition to at least one vertical limit of extent, or the vertical limit of extent of the chaincode within a vertical size limit in addition to at least one horizontal limit of extent. Therefore, as few as two limits of extent (or edges) may be used to approximate area, and/or identify "right-sized" blobs in the image.

As demonstrated above, the teachings of the present invention may also incorporate a blob-finding algorithm. This algorithm ensures that a target detection screener embodying the method of the present invention is operable to include not only edge-based figures, but right-sized area figures that would be found by traditional methods, as well. Furthermore, the blob finding algorithm may be used in conjunction with the edge based detector described above, in order to generate a set of potential target candidates.

At step 126, chaincodes defining edges and/or contours that have not been disqualified by the prescreener are subjected to one or more additional levels of evaluation, which will be described later in more detail.

Each path of the chaincode following a change in brightness represents a potential edge of a target. An edge is not merely a third aspect of an image separating the foreground from the background. An edge is a locus of points that has approximately the same change in brightness between two regions of opposite contrast. All pixels of an image contribute to an edge, but some pixels contribute more than others. The pixels that are part of the fastest change of brightness (greatest change in contrast between two pixels) are most edge-like, but a much quicker algorithm follows a path that separates pixels by a single threshold value. In one embodiment of the present invention, a path of a chaincode can be followed, yet involve fewer pixels than a traditional algorithm that screens by looking for right-sized areas (e.g., blob-based screener). Method 100 directly detects an edge with a beginning point at a precise (x,y) coordinate location in the image, meaning an individual edge may be identified, recorded, and stored for later retrieval. Method 100 requires no additional processing to identify individual edges within the image. The chaincode of method 100 of the present invention generates distinct edges, where each path of the chaincode has a beginning and end and a unique body defined by a sequence of integers.

Three general rules of termination have been described above within method 100. First, method 100 is operable to detect and reject any path of a chaincode that identifies a singularity. Second, if the path of the chaincode meanders too much (the distance away from the starting point is too small for the number of steps taken by the chaincode) that path will be rejected as ever being part of a valid target candidate. Third, if either the horizontal or vertical limits of extent of the path of the chaincode exceed a certain size threshold, the path of the chaincode will be rejected. In alternative embodiments, only one or some other combination of these termination rules may dictate the analysis of a given chaincode. Furthermore, other rules of termination may be incorporated into method 100, without departing from the scope and spirit of the present invention.

Excess meandering stops further progress and disqualifies it for consideration, but there are other rules of termination that will eventually stop the travel on all edges without necessarily discarding the edge from consideration as a target candidate. Each edge has an identity and a history of twists and turns, and from these many edge histories, a few likely target candidates may be selected for further analysis.

In accordance with a particular embodiment of the present invention, while the path of the chaincode is being evaluated for contours of about the right size, the edge history is monitored for sequences of chaincode values that show no deviation of the pixels more than forty-five degrees. This makes the chaincode follower a detector of straight edges. A chaincode is operable to record direction changes among the pixels that are either up, down, left, right, or any of the four diagonals. Accordingly, the most straight edge that the chaincode can discover includes direction changes no larger than forty-five degrees on either side of the average. Those edges that are within forty-five degrees of each other for a particular path length are the best the chaincode can do in identifying straight edges. The actual edges can be far straighter than the chaincode can reveal if the gray values of the edge pixels are studied. It is the task of method 100 to identify these straight edges as valid target candidates so that the intermediate discriminator may perform a second level of evaluation, which studies the gray values of surrounding pixels.

The Precise Measurement of the Straightness of an Edge

Where one phase is complete and the next takes over is a gray area, not a distinct step. Thus far in the detailed description, chaincodes were created and those that go around contours and are about the right size are recorded. Also recorded are straight segments. Before handing it off to the next phase, as part of the pre-screener, is the executive which decides which contours and which straight sections are to be included. One executive decision is to note the confluence of many straight edges. Another is the centroid of complete contours, which have near them some straight edges. There is another pre-screener step which utilizes a mathematical process called the Sobel transform. This uses floating points or large integer numbers and multiply processes. These are rather computer intensive compared to the chaincode path follower described above, and should be associated with later phases of target recognition. It is included herein the first phase because the Sobel is traditionally associated with, pre-screeners.

Many traditional screeners are "raster based," and analyze the entire image, one pixel at a time. It is a very fast way if you must evaluate every single pixel in an image. The path-chaincode described herein is not raster based, because it follows a particular change in contrast between adjacent seed points. There is a traditional image-processing algorithm called the Sobel Transform or "Sobel" for short. The Sobel is normally performed on the entire raster to analyze all the edges in an image. The Sobel is very valuable because it can precisely determine the direction of an edge by the shade of gray in adjacent pixels. But it is very computer intensive in that there are six multiply-operations for every pixel evaluated. Usually, a special hardware processor is built which is entirely devoted to the Sobel before other target recognition processes are done. In accordance with particular embodiments of the present invention, the Sobel is applied only to edge pixels of the path-chaincode. This saves time and processing power. Further processing time is saved if the chaincode can select before the Sobel step, what it thinks are straight segments.

Figure 10:
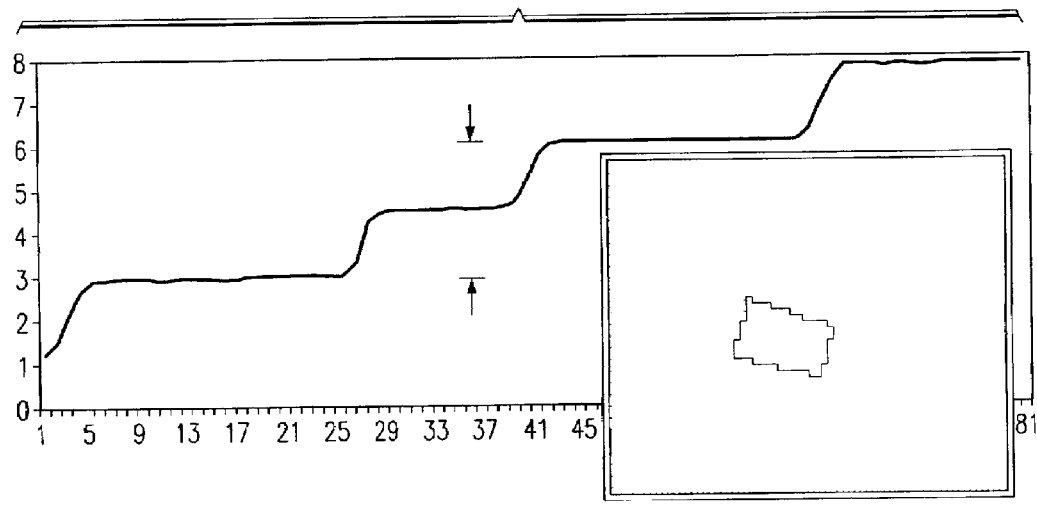
FIG. 10 graphically illustrates winding Sobel-chaincodes associated with images of widely different size, wherein the courser image has been blown up to show the individual pixels.
Figure 10:
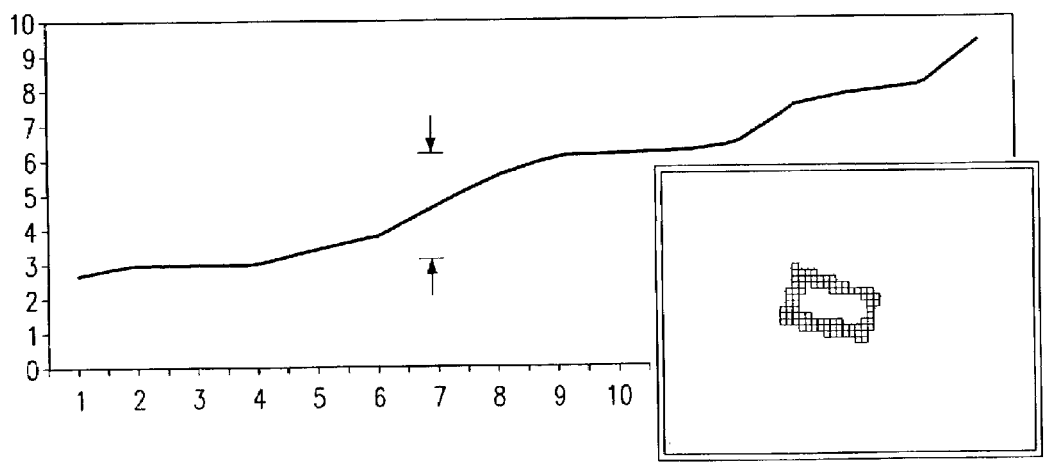

The evaluation of an edge by taking the Sobel of its points can give a very precise view of the edge's straightness. As seen in FIG. 10, even a few pixels on target can reveal the precise directions of the pixels along the edge. Those edges which are remarkably straight as revealed in the spread of numbers (the variance) of the Sobel Direction chaincode, can be used as a locator of man-made objects. If these very straight edges are further found to be near contours with extents that are just the right size for an object, there is a very sure indication of a likely candidate.

PHASE II: Intermediate Discriminator

Once the screener has detected a number of edges from the image that may correspond to valid targets, a second level of evaluation is performed. Straight edges that are approximately within a predetermined range of acceptable lengths and/or contours of acceptable meandering values are retraced to obtain the gray-scale value of pixel pairs along the edge. This is done to obtain the Sobel-chaincode of the edge. The Sobel-chaincode is different than the chaincode discussed in Phase I. The Phase I (pre-screener) chaincode is the path taken by the edge follower and will from now on be called the path-chaincode. Instead of recording the zero through seven different directions, the Sobel-chaincode uses floating point numbers (or large value integers). Accordingly, applying the Sobel at a point determines the gradient direction of a particular edge point. A very similar process calculates the Sobel Gradient-magnitude at each edge point.

The gradient-magnitude is an indication of how fuzzy the edge is while the gradient-direction is an indication of which way the edge is going.

The Sobel operator can be applied to determine gradient direction and the gradient magnitude. In accordance with particular embodiments of the present invention, an array of the gradient directions (a history of the gradient directions) is determined, and used to identify straight edges, curves, inside edges and outside edges. The gradient directions may also be used for comparison with templates and/or template segments, in order to identify targets. Target identification will be described in more detail in Phase III.

Next, the edges are sorted by their degree of straightness (Sobel-bandwidth). The method of the present invention looks at all the numbers of each edge, and statistically evaluates them. If the edge is very straight, the direction values will be grouped together (i.e., its bandwidth will be narrow). Mathematically, the method looks for edges with the smallest variances (e.g., standard deviation). These edges are sorted so that confluence of highly straight edges can be identified as a location of a likely target. In practice, the centroid of the confluence of initial points is the actual candidate. Another way to determine a likely candidate is if one or more very straight edges is near the centroid of a contour found by the pre-screener. The methods just mentioned could also be part of a pre-screener, but since the Sobel is at the heart of the Intermediate Discriminator, it is repeated here.

Figure 4:
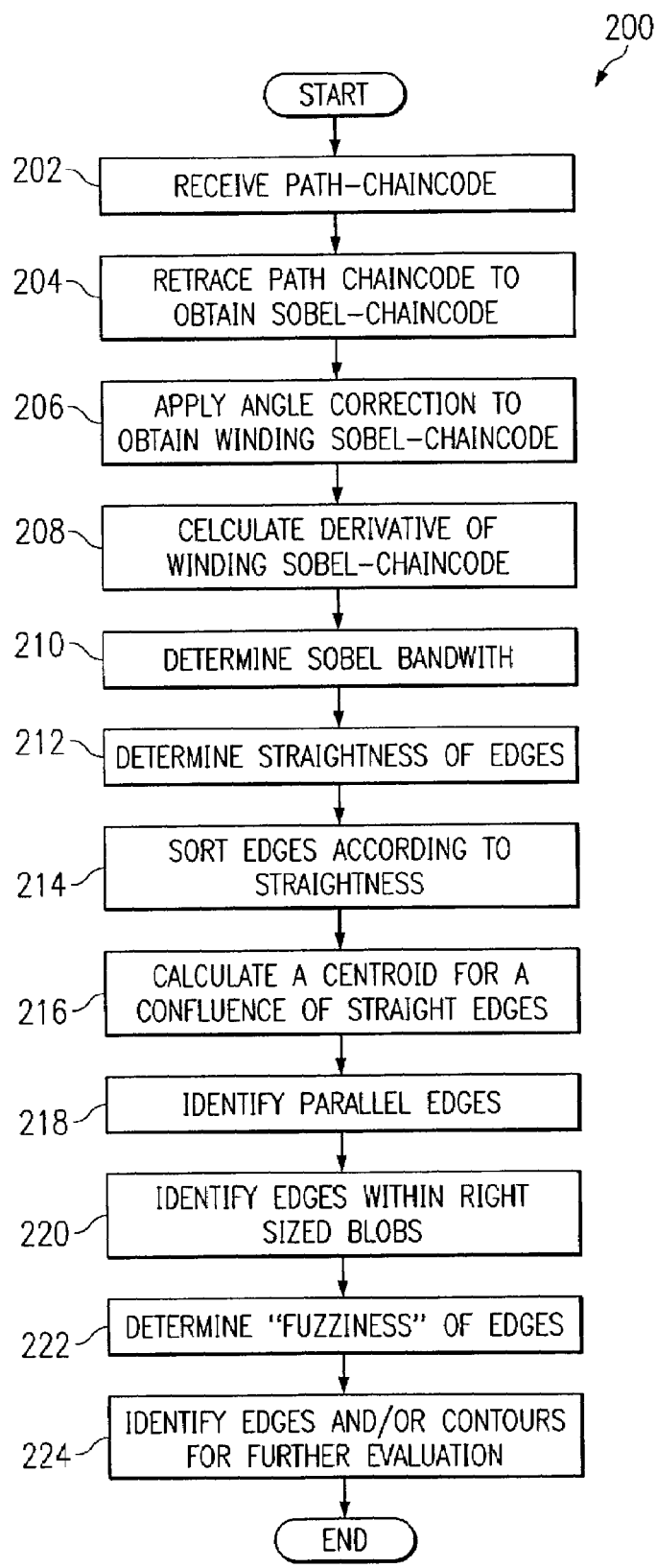
FIG. 4 illustrates a method for intermediate discrimination of potential target candidates identified by the pre-screener of FIG. 2, in accordance with another embodiment of the present invention.

FIG. 4 illustrates a second method 200 of evaluation, in accordance with a particular embodiment of the present invention. At step 202, a path-chaincode is received from the first level of evaluation. At the next step 204, the path of the path-chaincode is retraced, in order to obtain a corresponding Sobel-chaincode. A perfectly straight edge at any angle through the matrix of pixels that makes up an image may be analyzed using an algorithm known as a Sobel-chaincode. While analysis using a Sobel-chaincode requires more processing than the path-chaincode of the first level of evaluation, the results obtained are more precise. In operation, an edge code follower program is rewritten to instead playback an existing chaincode on the image. The path-chaincode is slavishly followed pixel by pixel. Calculating the Sobel-chaincode at step 204 is done by a process that resembles taking a ratio of the pixels on either side of the path. For reasons of speed, the "Sobel" part of the process is done after a pre-screening which finds candidate straight segments with the much faster path-chaincode follower.

Using a path-chaincode (e.g., the chaincodes described above with regard to FIGS. 3A–3B) means following discreet pixel steps which can only be resolved to up-down, left-right, and four diagonal directions. A "straight" edge identified in this manner could actually have many stair steps. However, that method is extremely fast at identifying potential edges of target candidates. It is also useful to determine approximately how big target candidates within the image are.

Figure 5:
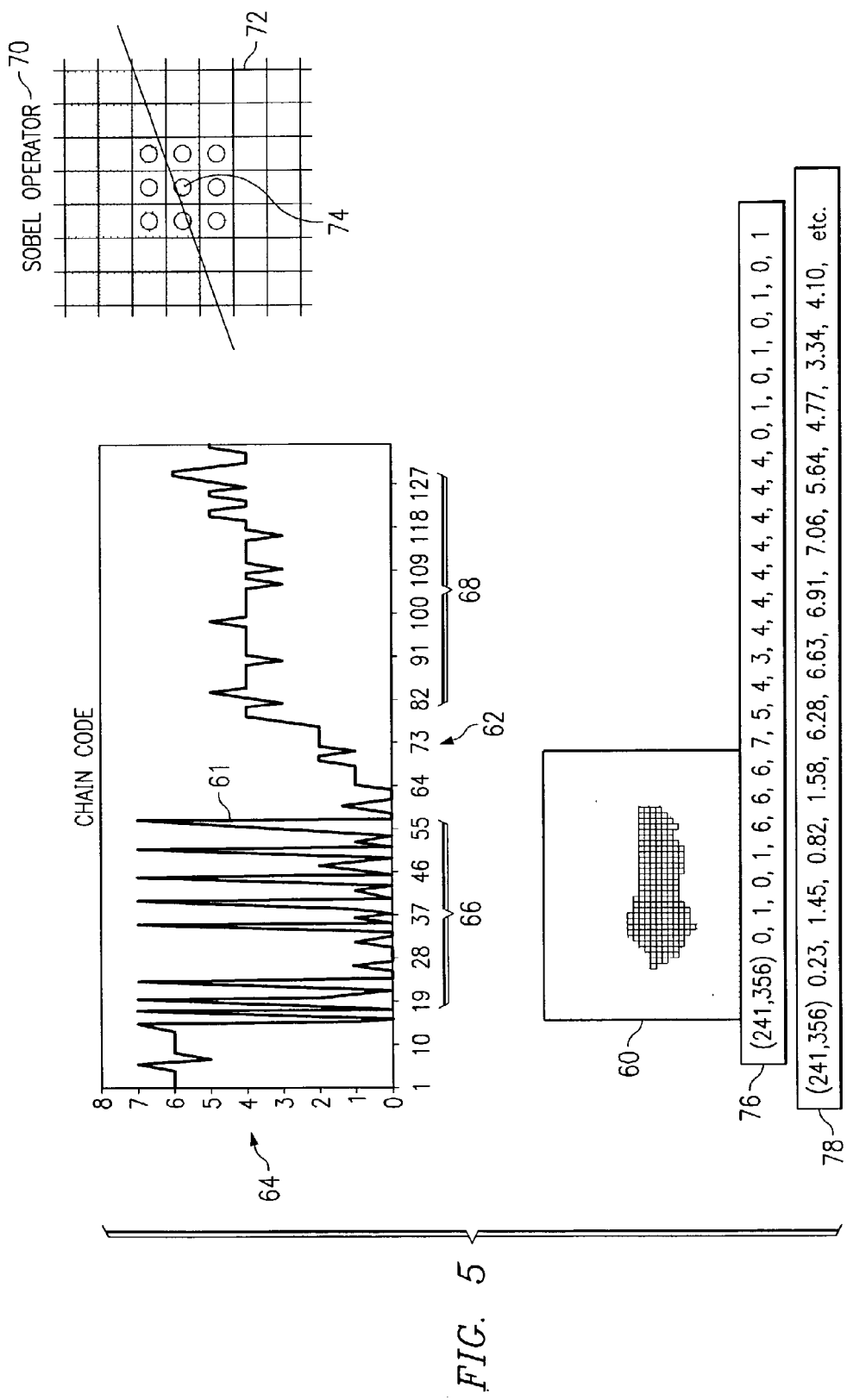
FIG. 5 illustrates a method of obtaining a Sobel chaincode using the path-chaincode identified using the prescreener of FIG. 2.
Figure 6:
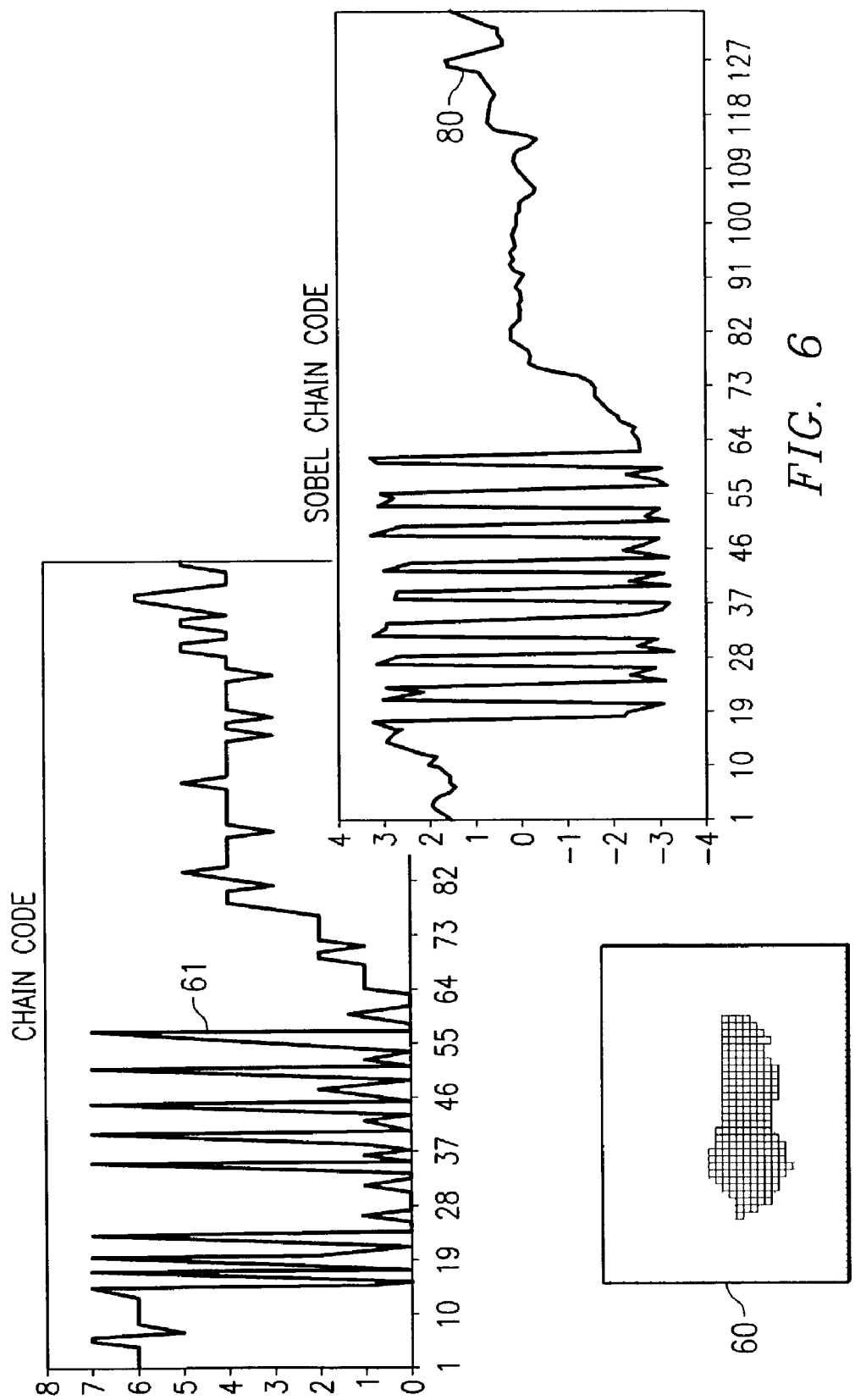
FIG. 6 graphically illustrates the path-chaincode and the Sobel-chaincode corresponding to the path-chaincode identified using the prescreener of FIG. 2.

The method for obtaining the Sobel-Chaincode is illustrated in FIGS. 5–6. FIG. 5 graphically illustrates the path-chaincode 61 of a contour 60, plotting the points (pixels) along the edge(s) of the contour 60 on the horizontal axis 62, and the direction (derived from direction key 42) along the vertical axis 64. Contour 60 corresponds with the shape of a tank, removed from a FLIR image. It is worth noting again that the path-chaincode is a record of the movement of the edge on a coordinate system that is limited to up/down, left/right, and four diagonal directions (eight total directions). The highest resolution is one part in eight, or forty-five degrees. The advantage of working in this environment is that the direction can be resolved with a three-bit integer. In addition, most code elements are nested "if"s which are very, very fast.

Reference numeral 66 highlights a portion of the graph which includes sudden and rapid "jumps" in the path-chaincode 61, which track the directional changes around the "wheels" at the bottom of contour 60. These sudden jumps correspond to where the direction goes one beyond the highest direction number. These jumps will be discussed later.

In order to improve the fidelity of the direction history (path-chaincode) along a contour, the most promising edges identified in Phase I using the path-chaincode are replayed (retraced) in order to determine a Sobel-chaincode corresponding to the edge(s). With the use of the Sobel operator, the eight directional values identified by the path-chaincode are expanded up to as many as twelve bits of angular resolution, depending upon the signal-to-noise ratio of the sensor. Such magnitude of precision can be applied to an object only a few pixels across. With this accuracy applied to such a small area, the contour can be used in template matching and other means of comparison for relatively small objects.

The right side of FIG. 5 illustrates the method used to determine Sobel direction values at each pixel, or edge point along contour 60. The direction values calculated using the Sobel operator 70 are not limited to forty-five degree increments, as they are using the path-chaincode. In FIG. 5, the values of the corner pixels on the right side of matrix 72 are compared to the corner on the left. The same is done with the corner pair at the top and the corner pair at the bottom. The arc tangent of the ratio of these differences is the exact angle of the edge, at the center point 74. The square root of the sum of the squares is the gradient-magnitude (the "fuzziness") of that point. The transform name "Sobel" is often hyphenated with the words "direction" and "magnitude." The word "gradient" and Sobel are interchangeable and those two are also seen together as in Sobel-gradient-magnitude. In plan English, the exact direction and fuzziness can be determined for each edge point of the path-chaincode. Those calculations are usually done at the heart of the same double loop (when embodied in software) that playsback the path. The amount of fuzziness is several extra math steps, and can be left off if only the edge directions are needed. If gradient magnitude (fuzziness) is obtained, it should be divided into the local contrast, to get a result measured in units which are invariant to overall scene brightness. The gradient-direction is easier to obtain than the gradient-magnitude and is inherently resistant to changes in overall scene brightness. Perhaps the most powerful aspect of the gradient-direction is that a direction for the edge is the same, even if the path the path-chaincode takes is slightly off. On the right side of FIG. 5, the eye can see that the direction of that edge (as small as it is), is about where the line is. The center point of the three-by-three operator will come up with the same direction as long as those nine are on some portion of the gradient. The analogy is blind person who is feeling the curve of a fender. He can tell you the direction the fender is oriented by feeling any portion of the curved surface.

Accordingly, using the Sobel-chaincode, the direction of the edge can be determined at each edge point, without reference to length. The Sobel-chaincode has several advantages. For example, a sixteen-bit angle can be determined instead of the three-bit angle of the traditional chaincode. The direction determined by the Sobel-chaincode is accurate for as few as three pixels on a side (e.g., by evaluating four corner pixels surrounding the middle one of the three edge pixels).

The Sobel-chaincode is operable to find more precise angles of the edge than is the path-chaincode. The limit in angular resolution of the Sobel-chaincode is the noise in the gray values in the image itself rather than the length of the edge. In a traditional application, the Sobel-operator is applied to every pixel in an image, but at step 204 of the claimed invention, the Sobel-operator is only applied to the pixels of the path followed by the path-chaincode. The path-chaincode is a history that can be used to playback the pixels. This feature is utilized at step 204 to determine a Sobel-chaincode for target candidates that are communicated to it from a first level of evaluation. Each edge "point" comprises two pairs of pixels, and each point has its angle determined at step 204. The angles are measured in radians and would be the same value (within the "noise" limits of the sensor) if the edge were infinitely resolved and its angle taken by distance subtended.

The bottom of FIG. 5 also illustrates the conversion from the directional values of the traditional chaincode to the floating point values of the Sobel-chaincode. Label 76 shows an array of direction numbers (including the start point) derived from the path-chaincode of FIG. 3A. The Sobel operator is applied at each point to derive the Sobel-Chaincode, which corresponds to array 78 of FIG. 5.

FIG. 6 graphically illustrates the Sobel-chaincode 80 associated with contour 60 described by the path-chaincode 61 of FIG. 5. It is apparent in FIG. 6 that the Sobel-chaincode is a smoother directional representation than that of the traditional chaincode of FIG. 5. Both have the very confusing jumps where the direction passes the equivalent of going one more degree than 360 degrees. (In radian measure, it is the jump when going a tiny bit over 2 Pi.) These jumps will be discussed in more detail later. The important point to note is the difference between path-code and Sobel-code on the long straight hood of the vehicle. The best the path-chaincode can do is a zigzag path. The same region path-chaincode can do is a zigzag path. The same region of the Sobel-chaincode is very smooth.

The statistical measurement of the Sobel direction spectrum yields a number analogous to bandwidth. It is the smallest angle, which encompasses more than half of the individual edge-point directions. The direction bandwidth of an edge typical of man-made objects is less than 250 milliradians (4 degrees). By measuring the Sobel at each edge point, a more accurate measure of direction can be made than by the path of the chaincode. The path-chaincode is limited to the directions to the eight neighbors of each edge point. The Sobel can obtain a floating point value angle around each edge-pixel. The results of the two distinct processes: (i) the Sobel-bandwidth; and (ii) the meandering-extent may then be forwarded to a clustering algorithm that sorts the edges according to their contours and flat spots. This can be considered an intermediate discriminate or part of the pre-screening depending on how you would like to organize the software development. But the Sobel-chaincode can also be used with the method called feature space analysis, which is more traditionally associated with the second phase of the target recognition process.

An issue may arise if the Sobel-chaincode is applied to a contour that curves beyond the referenced direction. That is, if you are at 359° and your next edge point curves two more degrees, the Sobel-chaincode value reverts back to 1°, not 361°. The same issue occurs using radian measure where $2\pi=360°$. This is the cause of the jumps in FIGS. 5 and 6 as the path-chaincode and Sobel-chaincode went around the wheels within the tracks of the tank. Note that it is a problem with both, but for the path chaincode, it does not matter because the chaincode player will jump back just as the chaincode recorder jumped forward. The processes applied to the Sobel-chaincode, however, for feature space analysis is not so forgiving. Therefore, at step 206 of FIG. 4, an angle correction is applied to the Sobel-chaincode values in order to obtain the "winding" Sobel-chaincode.

A winding Sobel-chaincode refers to a Sobel-chaincode having the below described angle correction applied to it. In accordance with a particular embodiment of the present invention, in order to overcome the issue described above, as values go beyond $\pi$ to $-\pi$ transition (when measured in radians). This is done in order to obtain an array of gradient directions without discontinuity. The angle correction may include adding or subtracting $2\pi$ radians to any of the gradient directions that seem to go past that transition point from either direction. The derivative of the Sobel array may then be taken, for further analysis without any artificial discontinuous values. Removing these jumps also allows detection of naturally occurring discontinuities such as the points of missiles. This may allow the Sobel-chaincode value to continue rising above 6.28 radians, or keep falling below zero.

Figure 7:
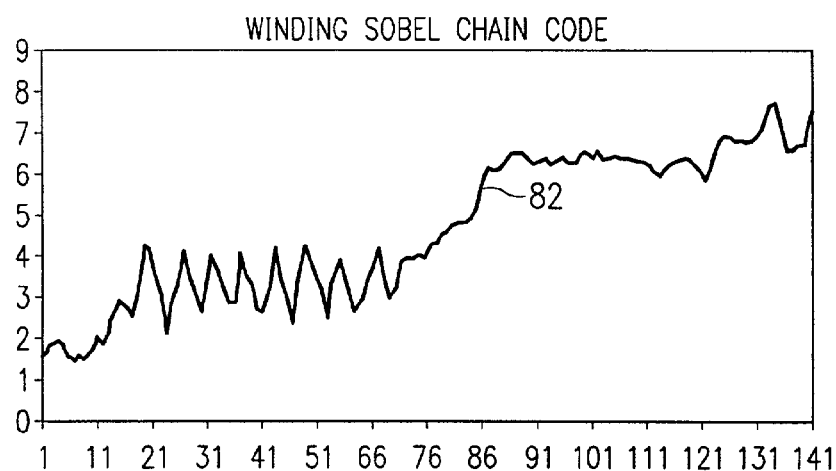
FIG. 7 illustrates a winding Sobel-chaincode which corresponds to the Sobel-chaincode of FIG. 6, after applying a direction correction.

FIG. 7 illustrates a winding Sobel-chaincode 82 which corresponds to the Sobel-chaincode 80 having the direction correction applied, as described in the previous paragraph. The winding Sobel-chaincode 82 of FIG. 7 demonstrates the improved graphical representation realized using the winding Sobel-chaincode. For example, without the direction correction referred to above applied, the wheels at the bottom of the tank appear to be almost complete circles (See FIG. 6, Sobel-chaincode 80). In reality, there is just one edge on each wheel which passes the 0 to $2\pi$ point. Applying the direction correction to obtain the winding Sobel-chaincode shows the wheels are just what human eyes see, wiggles in the image.

The winding Sobel-chaincode has one drawback, in that it is no longer periodic. Periodic means that the values on the y-axis are cyclical and you only need to display one such cycle on that axis. When a function is not cyclical, trig-like processes cannot be applied. This is no drawback, actually, since no trig functions (such as a frequency domain Fourier Transform) are performed. As will be described later in more detail, in order to accomplish template matching, the derivative of the winding chaincode is used. The derivative of something that artificially passes through $2\pi$ to zero or zero to $2\pi$ would be very misleading. As such, the winding Sobel-chaincode and the derivative of the direction complement each other well for template matching. The derivative is in accordance with step 208 of method 200. Several applications which incorporate the Sobel-chaincode and direction correction which are available for use in accordance with particular embodiments of the present invention, are described below.

The winding Sobel-chaincode enhances the ability to detect flat spots in an edge, or contour of an image. As illustrated previously with regard to FIG. 5, the path of a traditional chaincode has discrete 45 degree steps. However, referring to FIG. 7, it can be seen that the winding Sobel-chaincode 82 identifies a true direction history of the edge of high fidelity and without jumps. An important point to note is that the information used to determine the winding Sobel-chaincode is in gray levels of pixels surrounding the edge points. And the higher the signal-to-noise of the gray values, the more accurate the determination of edge direction. This is something that FLIRS are famous for. They may be limited in resolution (compared to video), but they can have a very high signal-to-noise.

Figure 8:
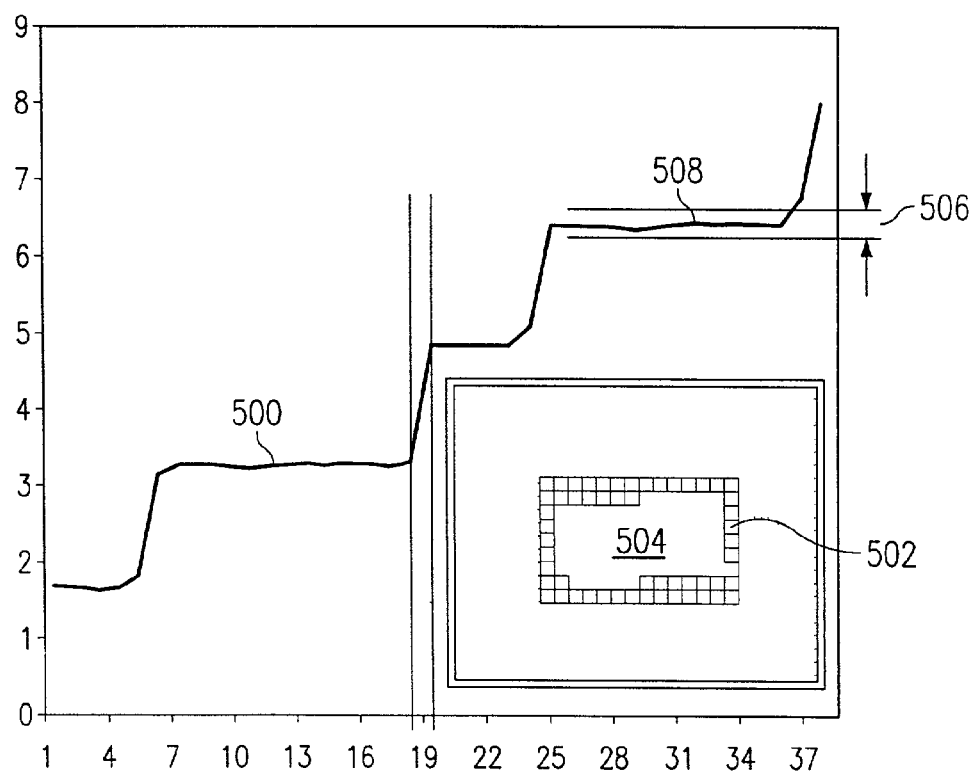
FIG. 8 graphically illustrates a winding Sobel-chaincode associated with an object having a plurality of generally straight edges with opposite edges which are parallel.

FIG. 8 illustrates the winding Sobel-chaincode 500 of a contour 502 around a bright spot 504 of an image. Two horizontal bars 506 are used to highlight a flat spot 508 in winding Sobel-chaincode 500. The flat spot 508 is a hesitation in the ever climbing winding Sobel-chaincode 500. Such hesitations occur when there is no change in the direction and hence appear horizontal no matter how the figure is rotated. Straight edges are somewhat unique to manmade objects and can be very easy to detect in a winding Sobel-chaincode, even if some of the sides are obscured by natural or man-made objects. This feature may be referred to as robust. This robustness allows the detection window (parallel lines 506) to be a very small fraction of the total height of the winding Sobel-chaincode.

Man-made objects typically include straight edges, and a statistical analysis of these edges which is analogous to a spectral bandwidth can reveal them. Accordingly, at step 210, this deviation of the mean is calculated. The deviation is referred to as the Sobel-bandwidth, wherein sharp spectral lines correspond to very straight edges. The flattest winding Sobel-chaincodes are ones with very small variations in their direction.

An additional step 214 may also be taken, in which edges are sorted according to "straightness", with the straightest edges being favored for further analysis.

The teachings of the present invention provide a number of ways to calculate, derive, and/or use data to identify particular objects within an image. The data collected using methods 100 and 200 may be used to accomplish a variety of feature detection techniques. Although many of those feature detection techniques are described herein, a multitude of others exist. For example, at step 218, parallel edges found within the image are identified using the techniques described below with regard to FIG. 9. A man-made object like a tank has sides which are parallel. Even when seen obliquely, tanks and trucks are characterized by their opposite sides being parallel.

Figure 9:
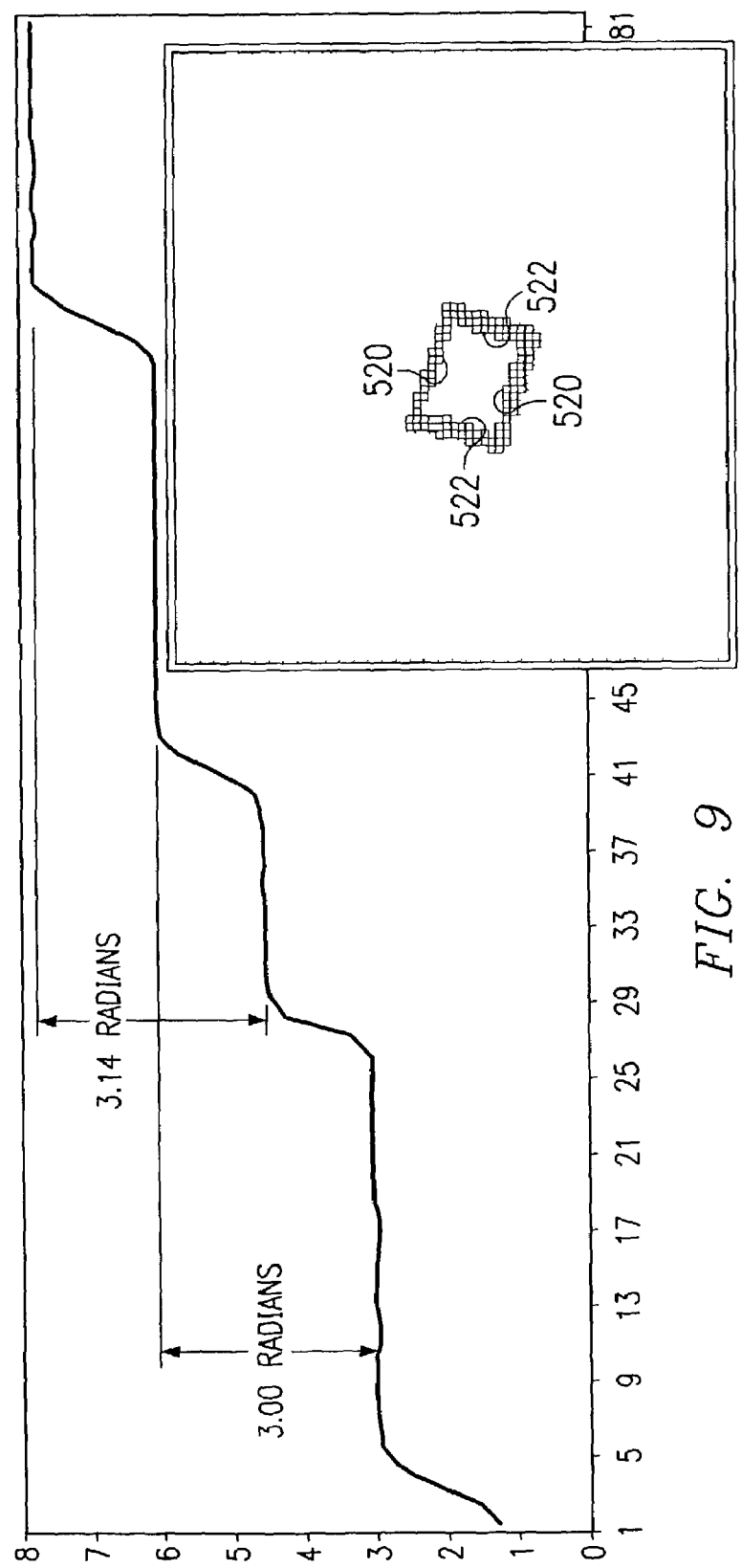
FIG. 9 graphically illustrates a winding Sobel-chaincode corresponding to an image having two edges which are not quite parallel.

FIG. 9 illustrates the precision with which contour edges can be measured, using the winding Sobel-chaincode. The non-parallel sides 520 of FIG. 9 can be seen to have less separation on the winding Sobel-chaincode than parallel sides 522. Accordingly, the parallel sides are separated by π, or approximately 3.14 radians, while the non-parallel sides are separated by approximately 3.0 radians. FIGS. 8–9 illustrate the simplicity of identifying straight edges (find the horizontal lines of the winding Sobel-chaincode) and parallel straight edges (find horizontal lines with a separation of approximately 3.14 radians).

One advantage of a particular aspect of the present invention can be seen in the winding Sobel-chaincode graphs of FIG. 10. The lower figure is only three pixels high. The horizontal axis of each graph is the edge pixel count starting from an arbitrary point (in this case, the middle of the left side, then going counterclockwise). The vertical axis is the direction of the edges in radians. Zero is a vertical edge, with white on the right. Straight edges appear as horizontal lines on the chaincode, no matter what their angle. Note that the regions of the chaincode corresponding to the non-parallel sides are approximately 3.0 radians apart, which is slightly less than 180°, corresponding to the tapered sides of the trapezoid. Compare that with the two flat spots on the curve that are slightly more than three radians (180° is approximately equal to 3.14 radians).

Significantly, with regard to the winding Sobel-chaincode of the lower graph of FIG. 10, the angle between the non-parallel sides can be determined to be slightly less than 180°, or π radians. This determination can be made using only the six pixels on a side in this image. The winding Sobel-chaincode is a way of getting the angle of an edge-pixel from the gray values of the pixels surrounding the edge-point. By using the winding Sobel-chaincode, very small objects (even as small as six by three, see FIG. 10) can have their edge direction measured very accurately. The direction accuracy is determined by how accurately one can calculate the ratio of adjacent brightnesses rather than by how long and how highly resolved the edge is. Edge direction accuracy is thus limited only by the signal-to-noise of gray values. This is particularly well suited for FLIRs where the signal-to-noise is usually much better than the more highly resolved video systems.

Figure 11A:
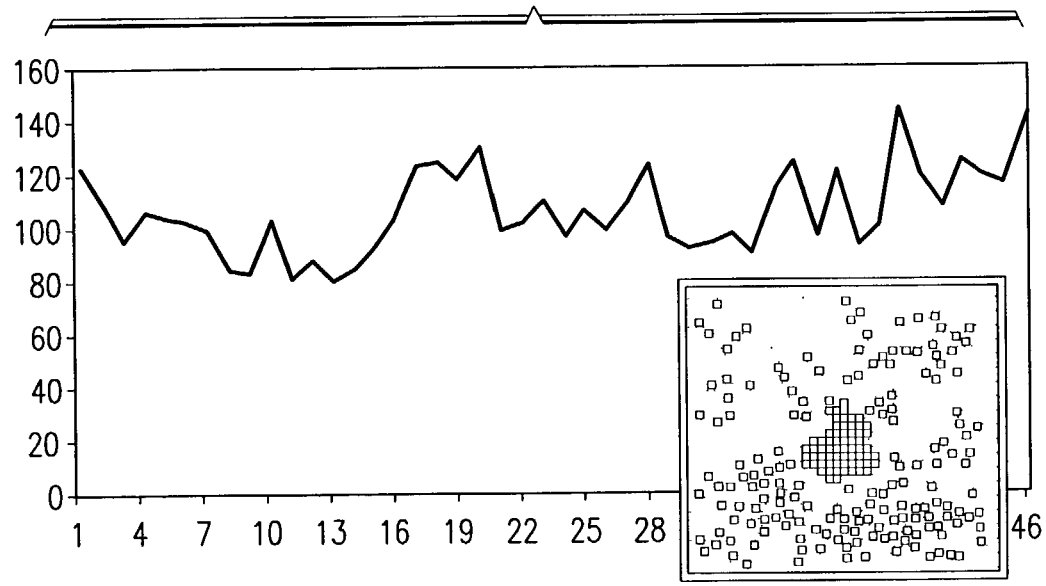
FIG. 11a graphically illustrates how blurryness of an edge is measured using the Sobel-Gradient chaincodes illustrating the brightness per unit step across the edge rather than the Sobel-Direction along the edge.
Figure 11A:
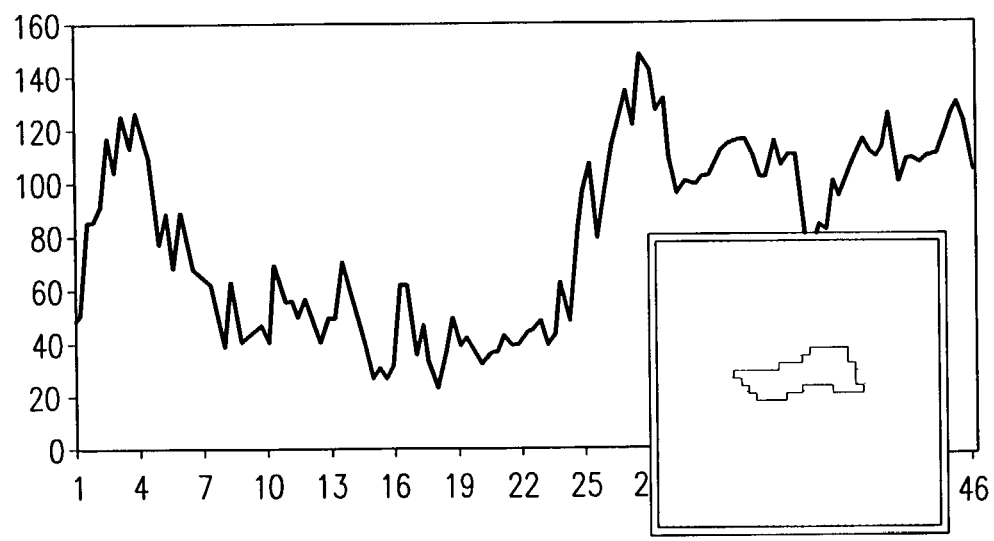

The Sobel-transform can also reveal the magnitude of the fuzziness at each point. In FIG. 11a, the vertical axis is a measure of how blurry the edge is, rather than what direction it is. The numbers are in units of brightness per pixel distance. By dividing that number into the local contrast, the yield is the width of the fuzziness in pixels instead of the slope (this is not done in FIG. 11a). This value turns out to be invariant to overall scene brightness, and thus, more useful in application. Although fuzziness width does not separate targets from bushes as well as direction does, fuzz width has been found to be an aid in matching templates with candidates, which will be described later in more detail. For example, it can be used in eliminating regions of template/candidate for matching because the edge fuzziness shows it is not part of the tank. Template matching will be discussed in more detail with regard to target identification.

The units of the graphs of FIG. 11a are pixel brightness-per-unit-step; lower values are fuzzier. There are many ways to give a relative number to the fuzziness, but it is useful to choose a method which is not fooled by the brightness and contrast of the image. Measuring fuzziness may be useful in further analysis of edges, contours and regions of interest identified using the techniques of method 100 and 200. Therefore, at step 222, the fuzziness of each edge that has been selected for further analysis is measured.

Figure 11B:
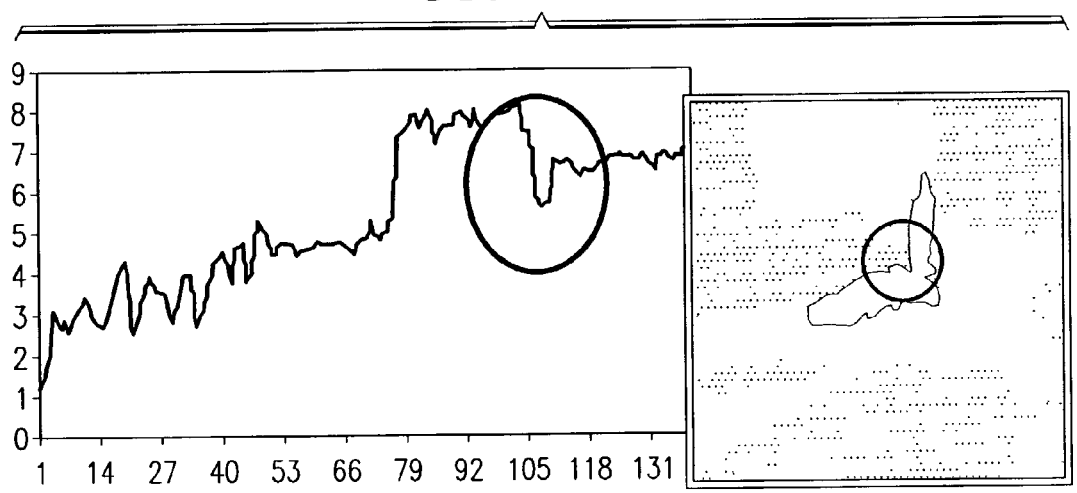
FIG. 11b graphically illustrates winding Sobel-chaincodes associated with objects having inside and outside angles.
Figure 11B:
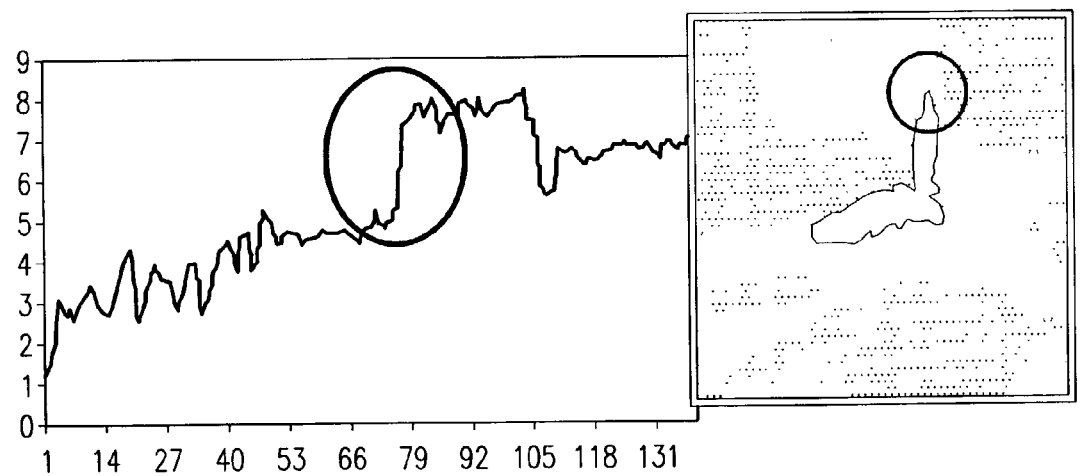

Inside and outside corners of an object can also be identified using the winding Sobel-chaincode. Corners are typically located as large vertical steps of a graph representing a plot of the winding Sobel-chaincode. For example, FIG. 11b illustrates an inside corner (top figure) and an outside corner (lower figure).

Since the winding Sobel-chaincode illustrates direction values that never strike the 0–360 (or 0–2π) discontinuity, feature extractors work on real world objects with cavities and internal angles in their contours. Such feature extractors include a flat spot detector, parallel-sides detector, corner detector (nose cone detector), fuzzy-edge width, and/or local contrast feature detectors. Each of these feature detectors works well because they are sensitive to small shape changes, yet, invariant to overall image changes such as size, rotation and brightness. These feature detectors are also quite different from each other (there is a lot of orthogonality). The feature detectors listed above are all derived from the winding Sobel-chaincode. There are other, more traditional feature detectors which are also very different yet invariant to overall image changes. These include number of bright pixels on target, for example.

In any particular application, an operator chooses the best combination of feature detectors available for that application. It is widely accepted that the most appropriate feature extractors, are integrated in a process called feature space analysis. Feature space analysis involves a graph of feature one from one feature detector (area-to-perimeter-ratio, for example) plotted on one axis and against feature two (length-to-width-ratio) on another. These are plotted against feature three (e.g., Sobel-chaincode straightness) on a third and feature four, etc. A typical number of features is seven or eight. Thus there would be seven or eight dimensions in the space.

In this manner, targets and potential targets appear as multi-dimensional dots in a multi-dimensional feature space. Targets can be found in a subspace of that larger space using linear algebra.

In the target recognition industry, an intermediate discriminator of target candidates is often done with feature space analysis. A typical feature is the ratio of perimeter to area. A very convoluted contour would have a very high value for this feature. Another is aspect ratio of that same area. There are as many as 8 to 12 such features used in a traditional feature-space recognizer. Most have to do with the distribution of brightness and texture within the contour. The subject of a particular embodiment of this invention,—the gradient direction array (the Sobel chaincode)—allows several more very powerful features to be measured; all having to do with the outside edge. The detection process of these new features will be described below.

Flat-Spot Detector

From the prescreener come many path chaincodes from each image. There are straight segments, and there are contours which encircle objects. The straight segments may or may not be part of a contour. The flat-spot detector is simply the Sobel bandwidth detector described above which is sent whole contours instead of line segments. The bandwidth values will be much smaller than for straight-line segments, but still very useful. A perfectly round contour where the flat spot was only four of its one hundred points would have at most four-percent of its edge points in a window of some size. A contour in the shape of the letter "D" could have as many as fifty-percent in the window. The Sobel bandwidth detector is slightly different for the flat-spot detector in that a fixed window (of experimentally determined width) is used instead of an adjustable one.

Parallel Side Detector

But even more useful is a double window detection process for detecting two straight edges at different angles. The most common angular separation is the 180° of the opposing sides of a box. A pair of windows separated by the distance Pi (180°) would suddenly find a high count of edge points when it got to a particular set of directions. The degree of parallelness can be calculated on any figure by noting the different between its single slit Sobel bandwidth (Flat-Spot Detector value) and its double slit Sobel Bandwidth. A parallelogram would have a rather large value, a trapezoid something less. This degree of parallelness would be not only useful for separating manmade and artificial contours, but for separating kinds of vehicles. A SCUD missile, for example, has a higher degree of parallelness than a tank.

Edge Width

Another easily obtained feature of an edge is the width of its fuzziness. An edge is not a black line between shades of gray. An edge is the transition from dark to light. It can be quite abrupt or fuzzy. This width can be calculated in a process that is very much like the method of getting the Sobel direction. It is called the gradient magnitude. Instead of the ratio of pixel values (for the direction), the process involves the square root of the sum of the squares of adjacent pixel values (90° to the path). The units of gradient magnitude is the change in brightness per pixel. If this value is divided into the contrast between the inside and outside of the object, the gradient magnitude becomes a width; a fuzziness width in units of pixels. (The contrast measurement is a separate detection process familiar in the industry.) Getting them into units of pixels (instead of change-in-brightness per pixel) is important because it then becomes invariant to the brightness of the scene.

Invariance

By involving the contrast, the edge-fuzziness of metal against dirt is the same no matter how the scene is lit. A bush is the same amount fuzzier than a tank if the scene is mostly bright or mostly dark. It is invariant with the uncontrolled lighting conditions of the scene. Another uncontrolled condition of the scene is the size of an object on the image (range to the target). If a detector can be made to yield the same value for the object regardless of its size, the detector is said to be invariant to size. There is a third uncontrolled image condition that all good detectors should be invariant to rotation. A tank-like shape should be a tank-like shape no matter how it is positioned in rotation on the image. If it is rotated on an axis not parallel to the line of sight, such as the pose of the tank on the ground, that is a very specific invariance that intermediate discriminators are not expected to solve. There is a fourth uncontrolled image condition, having to do with whether the object is in the center or near one corner. This is called position invariance and is trivial in that all detectors seem to solve that one without any effort. The three Sobel chaincode based feature detectors described above are invariant to all four uncontrolled image characteristics.

More Detail on the Sobel Bandwidth

When a region of interest has been found, the straightness edges of that region of interest can be processed by the Sobel chaincode engine. The Sobel chaincode can then be analyzed to see if any segment has a particularly high degree of straightness. Most manmade objects have straight edges in their contour and it would seem appropriate to measure this characteristic. The straight edges found by the prescreener are only roughly straight. But the Sobel chaincode carries much more precise information about the edge and can be evaluated in the following manner: the Sobel chaincode is a list of single numbers like 1.23, 1.25, 1.19 and so on. The closer these individual numbers are to each other, the straighter is the edge. The process for extracting the degree of straightness can be a simple statistical process. In the preferred method, the list of numbers are passed through windows of various widths and the number of numbers within the windows counted. The smallest width that contains over half of the edge directions is a measure of the straightness. Instead of width that contains half, it could be the standard deviation. There are any number of ways to evaluate the width of this distribution. However, it is done, the analogy is similar to finding the width of a spectral line in a spectrum. (Hence, the name Sobel bandwidth.)

Using the feature space described above, particular edges or contours are selected from the dozen or so candidates from phase I, so there is only three to five to be passed on to the third phase. In Phase III, a target name will be given to each one, or the one most threatening target will be identified for the guidance part of the weapon. This passing on is represented at step 224 of method 200. In the next disclosed embodiment, such edges, contours and/or regions of interest are used again in target identification by the method of template segments. However, it should be recognized that the teachings described herein may be useful to accomplish various forms of feature extraction and, ultimately, identification of targets or target candidates.

Phase III: Target Identification

The teachings of the present invention employ a target identification scheme for identifying targets in the image of a two-dimensional sensor, such as forward looking infrared (FLIR) images. A template matching process is employed in which the template and the candidate are arrays derived from contours of figures. The arrays are the derivative of the Sobel directions at each point on the contour of the candidate or template. Each template is actually a segment of a full sized template. In practice, there are dozens, and often hundreds of template segments that must be compared with each candidate.

The method disclosed herein uses a two step template matching procedure: (i) template segments are made to slide around the candidates to find the best match; and (ii) a higher level process recognizes the positional relationship with other template segments taken from the same full sized template. The two step process is helpful, since many template segments will find a good fit on just about any object. Two arrays "correspond" or fit, when the elements of each array are moved with respect to each other so that where they overlap, they have the least difference. There are several ways to measure this least difference. The most common is the covariance divided by the product of the array sums. Another is the square root of the sum of the squares and a third is a simple difference. The simple difference is fastest and works best if the gradient direction elements are first differentiated.

However, in accordance with a particular embodiment of the present invention, such a "match" is disregarded, unless the template segment is in proper positional relationship with at least one other template segment from the same full sized template. Scoring (likelihood that a target has been identified) does not rely solely on how well the "fit" is between the template segment and the candidate. Instead, scoring takes into account how many segments from the same template are in a proper positional relationship. In accordance with a particular embodiment, the quality of the fit between the template segment and the candidate is used a "tie breaker" in determining whether a target has been identified.

Segmenting the template allows correlation even if pieces of the target are slightly out of place, such as an articulated gun or when portions of the target are obscured or adjoined. An additional benefit is forgiveness of natural errors such as slight misalignments or incomplete size correlation between the template segment(s) and the candidate(s). These benefits are realized by employing two mechanisms for the matching process: (i) a correlation (matching templates to segments); and (ii) an executive (analyzing fit, and relationship with other segments of template). These mechanisms work well synergistically because they are so different. Each can be fine-tuned without compromising the other.

The identification of articulated or partially obscured targets is a critical problem in the defense industry. It is particularly critical since recognition is now required of autonomous weapon systems which discover their targets after a long search. These weapons are limited in their ability to change position to get an ideal line of site to the target field. A useful template matching process should be flexible to expected changes when the candidate is the target, while still being able to separate with a wide margin all candidates that are not a target. This compromise has no ideal relationship in prior systems, because the mechanism that allows flexibility is usually the same mechanism that separates targets from non-targets. That is, to make the system flexible is to compromise its ability to discriminate. As mentioned above, the method(s) and system(s) described herein allow this flexibility, since each system can be fine tuned, without affecting the performance of the other.

Figure 12:
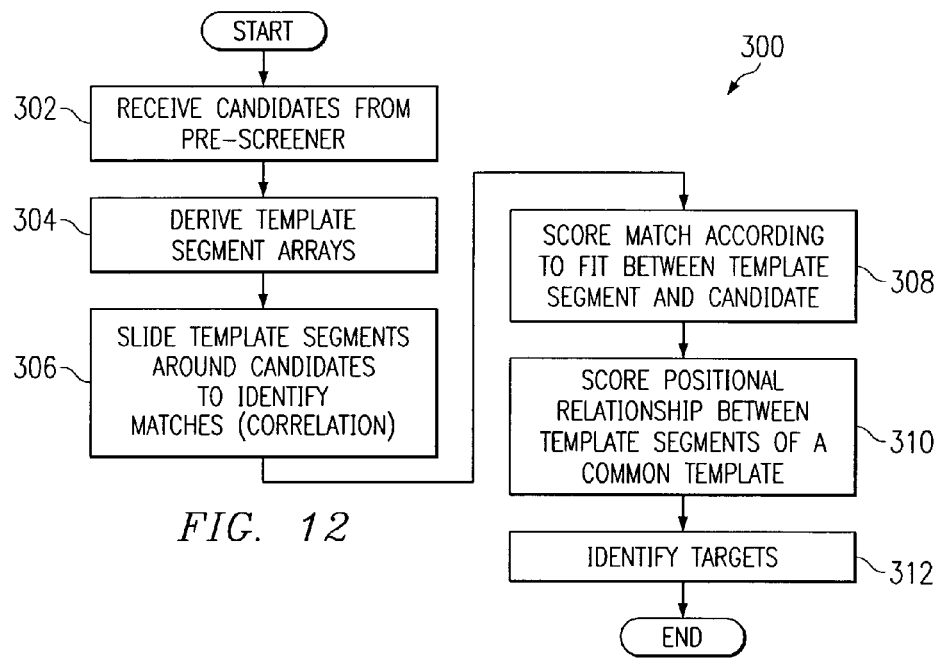
FIG. 12 illustrates a method for identifying targets screened by the earlier methods described in FIGS. 2 and 4 above, in accordance with a particular embodiment of the present invention.

FIG. 12 illustrates a method 300 for identifying targets, in accordance with a particular embodiment of the present invention. The method begins at step 302 where a plurality of candidates are received from an image (pre)screener or intermediate discriminator. In the illustrated embodiment, the candidates are arrays of floating point numbers which represent the derivatives of Winding Sobel chaincodes of edges and/or contours that were identified using methods 100 and/or 200.

Figure 13:
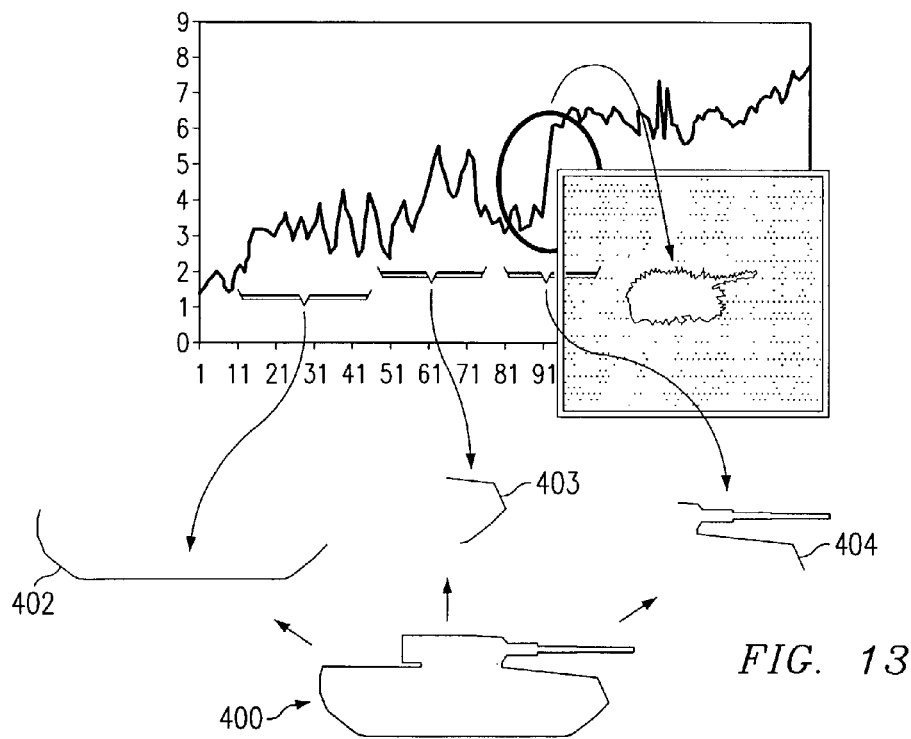
FIG. 13 illustrates a template having a plurality of associated template segments, in accordance with a particular embodiment of the present invention.

At step 304, template segment arrays are derived. Actually, these will be made ahead of time, but they are taken from memory at this point in the target identification process. In this context, templates refer to objects of interest in the target recognition industry, but made in exactly the same way the candidates will be evaluated. For example, a template may refer to the derivative of the Winding Sobel-chaincode of a particular tank, or other weapon system. FIG. 13 illustrates a tank contour 400. The template is broken down into a plurality of segments (e.g., template segments 402–404 of FIG. 13). Next, the derivative of the Sobel chaincode of the template segment is derived (step 304). In practice, a target identification system will be pre-programmed (pre-loaded) with arrays of floating point values which represent the derivative of the Sobel chaincode of the template segment. In a missile or sub-munition, all the template segments will take a turn at the candidates. It is possible that at the depot or from the cockpit, an operator can load particular sets of templates that the system will seek to identify by comparing the template segments to candidates identified in real-time, in a theater of military operations.

Templates are typically known objects, and templates are generally created at a depot or a place of manufacture. The making of segments out of the whole template can be done at certain inflection points or arbitrarily by merely dividing it by three, four, or whatever number of segments the operator desires. Template segments are identified by what they are a part of but they will also include information having to do with its orientation with respect to the other segments from the same full size template.

Template segment files may include the following information: (i) derivative of the winding Sobel chaincode used to find the match; (ii) the path-chaincode itself used to find the angle of the candidate; (iii) reverse path chaincode to the reference point held in common by all segments of the whole template; and/or (iv) fuzz-width chaincode. Item iv is the local contrast divided by the Sobel gradient-magnitude at each point. This is how thick the fuzziness of the edge is at every point. After fitting with the direction chaincode, this "fuzziness" chaincode is compared with the fuzziness array in the candidate. If there is a big difference, that point is removed from the gradient-direction matching process and the template segments are allowed to look for fits elsewhere. Continuity in the width of the fuzziness is an indication of continuity in the object. If ten pixels in a row are very different in fuzz width, then those ten candidates pixels are probably not part of the same object. The most common example of that is when the obscuring or adjoining object is a tree. A tree typically has very fuzzy edges. Disregarding fuzzy sections is not as good as recovering the lost piece of the target but at least it is not mislead by the tree's contour.

As the images are received and analyzed by the target recognition system, candidates are identified using methods that may include the teachings of methods 100 and/or 200. Those are primarily a way of reducing the number of candidates so that the slowest and most accurate processes such as template matching can be done in real time. The method 300 is the process sequence for template matching using the Sobel-chaincode. Template segments are floated, and slid around candidates, to find particular segments that fit a particular candidate(s) (positive match), at step 306. Fitting the template segments to the candidates comprises sliding one array of float values (template segments) past a larger one (candidate), and at each step performing a comparison process. The act of sliding one past the other is rolling the silhouette of one figure around another. The comparison process may include one or more of several mathematical methods, including the correlation, sum of the differences, absolute values, the sum of the differences squared, or average of the products.

The arrays that are being compared between template segments and candidates are the derivatives of the winding Sobel chaincodes which are described above. The Sobel-chaincode is the precise direction history of the contour. The "winding" prefix is to indicate a process which keeps the direction values from jumping when it gets near the 360-zero point. And this was necessary so that an artificial discontinuity would not throw off the derivative. The reason for the "derivative" will be explained now. The Sobel chaincode is affected two ways by a rotation of the candidate with respect to the template segment. These can be seen in FIG. 14. The candidate-silhouette on the left is almost one hundred and eighty degrees rotated with respect to the candidate-silhouette on the right, and both are different than the attitude of the template segment (not shown in FIG. 14).

Figure 14:
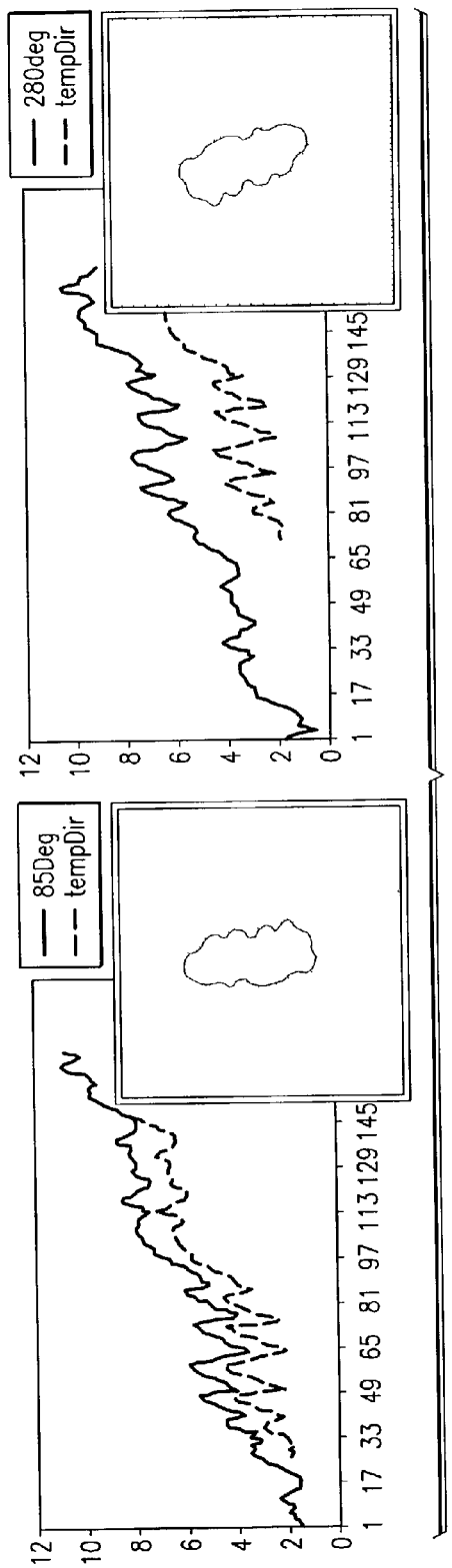
FIG. 14 graphically illustrates winding Sobel-chaincodes used for template matching, in accordance with a particular embodiment of the present invention.

The template-segment in each silhouette of FIG. 14 is only slightly smaller to better illustrate the match. In practice, the template segment would be one-third to one-fourth the size of the candidate. The segment curves of FIG. 14 have been positioned to be at the correct point along the candidate horizontally. However, there remains a difference in the vertical dimension. That axis is the rotation of the candidate with respect to the coordinate system of the image. The horizontal axis is the position along one edge where the chaincode starts on the candidate. Both horizontal displacement and vertical displacement have to do rotation. That is very confusing because we are accustomed to thinking about two dimensions as representing an aspect of position. However, to the direction worm that follows a contour, there is no such thing as position. There is only direction change and steps along the journey. In any template matching problem, the trick is to reduce the number of dimensions to one so that you only need to change one variable to find an optimum. That is, to position the curves so they slide along each other.

One way to reduce the dimensionality of this problem is to subtract the Sobel chaincode of a perfectly round disk. This lowers the up-and-to-the-right slope down, so that all that remains are little wiggles about the y=0 line. Another method is to pull the entire curve down to zero at certain inflection points that can be found in both candidate and template-segment. An improved method is to obtain the progressive difference, or "the first derivative." In electronics, a similar correction is called AC coupling. To continue the electronics analogy, it is similar to passing the waveform, through a capacitor. Only the quick oscillations will come through and again, equally distributed about the y=0 line. In this manner, alignment can be done by sliding the silhouette in a single dimension. This is why the derivative of the winding Sobel chaincode is used for template matching, in accordance with one embodiment of the present invention.

After identifying matches of varying perfection, between template segments and candidates, the executive process scores the candidate using two criteria. At step 308, the executive scores the candidate based upon the quality of fit between the template segment and the candidate. At step 310, the executive scores the candidate based upon the positional relationship between the template segment, and other matched template segments from the same full size template. In other words, this scoring is done based upon how well the segments from the same full template line up with respect to each other and how that alignment compares with the alignment of other sets. This allows the system to identify targets at step 312.

Each template segment is forced to find the best fit it can on the candidate. By trial and error, a threshold for the alignment value is chosen to eliminate the worst fits from further consideration. That threshold is actually the first executive decision. The template segment for the barrel around a gun, for example, should be allowed to find nowhere to rest on the figure of a truck. Without this threshold "fit" value, any segment is bound to find one place on the candidate that it best fits on.

Figure 15:
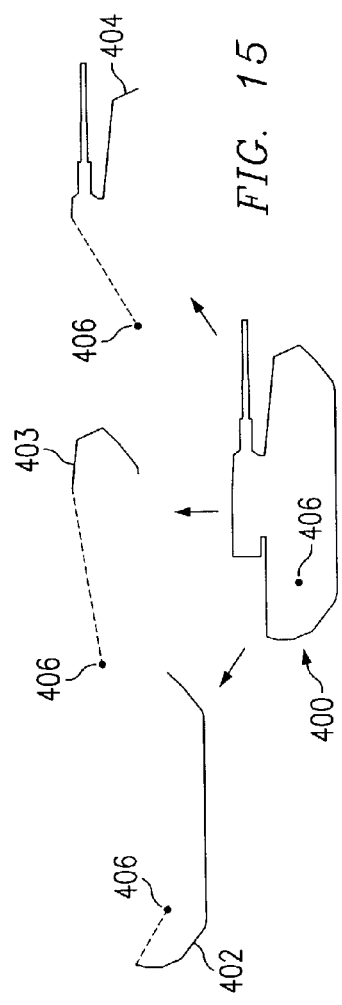
FIG. 15 illustrates the template of FIG. 13, in more detail.

For those template segments that have acceptable (above the threshold) alignment values, their position is noted with respect to each other. FIG. 15 illustrates this point further. Reference point 406 is arbitrarily selected on the full template. Each template segment 402–404 keep this same, common reference point 406. If each of segments 402–404 finds a good fit on the contour of a target candidate, then it is logical that their reference points will exactly overlap. By measuring how closely their reference points line up after template segments find a match, a second scoring consideration allows the executive to score the likelihood that a target has been identified.

Consider, for example, several target-templates, each divided into eight segment templates. If six of the template segments of one target-template find matches on the contour of a candidate, whereas only four from another template find matches, obviously the first is a better match than the second. But, if the four find matches and their reference points all line up perfectly, whereas none of the six matches have reference points that overlap, than the four segment match is better. It may be confusing to think of the best segment sets being chosen to fit a candidate instead of finding the candidate to fit the template, but recognize the scope of the problem here. There are dozens of template sets. Some are of objects you want to make sure you do not hit, like a school bus (which very much resembles a SCUD missile carrier). Some are the same target but in different poses. At the highest-level executive of the target identification process, decisions are made as to which is the most appropriate thing to hit. This level of decision is not being addressed here. The executive here is merely trying to give a name to each object it is handed.

This decision gets more difficult if the average mutual difference between the points are quite similar for the two template sets upon two different candidates. In that case, the "tie-breaker" would be to compare the actual alignment (fit) values. Weighting values can also be given to certain segments which carry unique information. For example, the barrel of a gun is very special as are the four wheels on the bottom side of an APC.

The reference points on the segments that are supposed to line up with each other can be any point. It could be the first point on the first segment or even a point off the contour such as the center of the whole template. In accordance with a particular embodiment of the present invention, the reference point of a template is selected as the most appropriate "hit point" for a weapon firing at the target candidate. For example, reference point 406 of FIG. 15 is selected because it is considered the best place to strike the tank in combat. Therefore, when the reference points of several template segments line up, that point also becomes the precise aim point.

In the pre-screener, edge segments which are straight and in the vicinity of a contour of the right size is the main indicator of a region of interest. In accordance with a particular embodiment of the present invention for template matching, the contour is used rather than the straight edges because the contour is less fooled by sun angle illumination, the pose (angle presented to the sensor), and the effect of age on the emissivity of the surface. It was further chosen to use the Sobel direction as the elements of the chaincode (instead of the path chaincode). This was selected because very unique information about the shape can be found in a very small number of pixels, down to only a few pixels on a side. So that sliding one figure over another can be done in one dimension, the derivative of the Sobel is used, which requires that the discontinuity (at the $2\Pi$ to $-2\pi$ transition) be removed (the winding Sobel). This combination allows strange articulations of the pieces of the target or obscuring trees to defeat some of the template segments while still allowing positive identification of the pieces that remain.

Another reason to choose the contour rather than all edges is the ease with which it can be cut into segments. This is because the comparison is done to a signal rather than an object. (It would be difficult to decide where a turret begins and the gun leaves off, if you were to cut an image-like template into sections.) Although the edge goes around a figure, the matching process involves sliding in only one direction (this is aided by using the derivative of the Sobel chaincode), as described above. The template can be parsed like a sentence can be cut into phrases. The length of the segments need not be equal and they need not fit as concatenated pieces either. Some segments can overlap, a large segment can even entirely include another smaller segment. The choice of segment end points can be arbitrary, or chosen around key junctures (such as where the gun barrel joins the turret) which remains roughly the same throughout changes in articulation. A segment can even be discontinuous leaving out some sections as not part of the matching process. This would be appropriate, for example, for parts that take on the temperature of the ground and in operation are always invisible.

More on Matching Criteria

There are two criteria matching. One is the degree of fit of each of the template segments on the candidate. This value is automatically obtained in the process of circulating the segments around the candidate finding the best place to fit. The best fit is when the elements of each array have the least difference. There are several ways to measure this. The most famous is the covariance divided by the product of the array sums. Another is the square root of the sum of the squares and a third is a simple difference. The simple difference is fastest and works well if the gradient direction elements are first differentiated. But "fit" is not the most important criterion. The most important is the positional relationship of the various elements.

Consider an eight-segment template. If six of the template-segments of one template find matches on the contour of the candidate, whereas only four of another find good fits, the set of six would seem to be better. But if the four are in the correct relationship whereas only two of the six are, the choice is clear. It is the one with only four. The method for finding the positional relationship between segments is to have a point, which all segments of the same template share. That point-in-common would not be on most; perhaps not on any of them. But when placed in proper relationship, their points in common would all be on the same pixel. If after a process of matching placed the segments around a candidate, these points-in-common found to be very close to each other, then the segments are in the right position. If only two are on top of each other, then only two segments found their home. Where it gets hard is if the average mutual distance between the reference points is quite similar for two template sets. In that case, the tiebraker would be to compare the actual alignment values. Weighting factors can also be assigned to certain segments, which carry unique information; the barrel of a gun is very special, as are the four wheels on the bottom side of a Soviet APC.

Another aspect of this invention is that the place in common to all segments does not have to be on the contour. Advantage can be taken of this by making the reference point held in common by each, the hit point for the weapon.

The process of placing the reference points comes after the fitting process. It involves drawing a backward path, where the final step must be corrected in angle. The angle is the angle of the template with respect to the candidate. The template is most likely a straight and level object. Even if the source material for templates is a real life scene, the pose will most likely be different than the candidates. The nature of the matching process is to roll one contour over the other. When the best position is found, the angle between target and template can be measured by how far it rolled along the path. That is, the horizontal axis. The relative angle can be recovered with an additional array in the template segment; the Sobel chaincode before the derivative was taken. There is a lot of processing involving float values and trig functions, but only the reference points need to be rotated. That effort is further rewarded if that reference point is chosen as the aim-point for the weapon. That is because if there was a requirement to hit a vulnerable spot, that position would have to be de-rotated anyway.

Detailed Examples of Phases I, II and III

In accordance with a particular embodiment of the present invention, various aspects of the methods and systems described herein may be embodied in software. One such embodiment is described below.

There are two aspects of the chaincode: (i) a portion that travels the figure; and (ii) the portion that calculates the direction (or magnitude) of the edge points. Each of these aspects deals with direction. One is far courser than the other, but the more accurate one is much slower. The section of code that creates a faster one (the path-chaincode) is shown here:

```
do {         // chaincode movement
    do {
        if((code = ++code & 7 == lastcode) break;
    } while(getPixel(image,
    (y+table[1][code]),(x+table[0][code])) <= threshold);
        // straight edge detector goes here
        // meandering extent algorithm goes here
} while(test);
```

It is a double loop where the inner loop pivots around a single edge point to determine which way to go for the next step. The decision is based on a threshold of brightness. (That threshold is determined in a function that is called before the chaincode follower is started. That initializing function also determines the initial point and direction for the chaincode to start moving in.

In the outer loop, the chaincode steps around the figure. This is where the detectors are located, which can amount to thousands of lines of code. Although the code may be many times larger than other screeners, it is still faster because there are so few loops. Most of the codes are nested "if"s which isolate most of the code away from the main flow on any given pass. Slower processes, for example, those that determine the Sobel, are done after edges of interest are identified. The chaincode for these particular edges can be re-visited if certain conditions have been met.

The meandering extent algorithm is very complex, and is best understood with actual code examples:

```
// As the extents grow, see if the height and width are acceptable. This is different than the
// check for wandering below, in that this looks at the distance between opposite extents no
// matter how long it takes to get there. The aimless motion is detected by noting the ratio of
// extent to cc_count. All of these should be done only occasionally, such as each time it is no
// longer partOf_a_Flatspot, or every cc_count modulo 20 and then for sure when cc_count
hits its //limit
        if ((cc_count-offsetM) > 0 && cc_count%9==0) {
                extentWidth = lastMovingRightX - lastMovingLeftX;
                extentHeight = lastMovingDownY - lastMovingUpY;
                if (extentWidth > extentLeftRightMIN_M && extentHeight > extentUpDownMIN_M) {
                        // ACCEPT if bigger than minimum
                        diagnosticOKwidthAndHeightCounter++;
                        if (extentWidth > extentLeftRightMAX_M) {
                                doneWithEdge = TRUE;      // REJECT if too wide
                                closedFigure = FALSE;
                                diagExceededHorizExtentCounter++;
                        utilities.markImage(BLUE, 9, x, y, YES);
                }
                if (extentHeight > extentUpDownMAX_M) {
                        done WithEdge = TRUE;      // REJECT if too high
                        closedFigure = FALSE;
                        diagExceededVertExtentCounter++
                        utilities markImage(BLUE, 9, x, y, YES),
                }
                // When are we done getting the extent?
                // In here we've met the minimum width and height requirements. There is, however, one
                // more requirements. It is not enough that one side gets pushed out the minimum All four
                // must have been bumped at least once for it to be "closed." That's what's going on here.
                if (bumpLeft) bumpCounter++;
                if (bumpRight) bumpCounter++,
                if (bumpUp) bumpCounter++;
                if (bumpDown) bumpCounter++;
                if (bumpCounter == 4) {         // 3
                        doneWithEdge = TRUE;
                        closedFigure = TRUE,
                        diagnosticOKBumpCounter++,
                        midExtentXpos = lastMovingLeftX + extentWidth/2;
                        midExtentYpos = lastMovingUpY + extentHeight/2;
                        utilities.markImage(GREEN, 91, midExtentXpos, midExtentYpos, YES),
                }
                bumpCounter = 0,
        }// end if bigger than minimum
        // Wandering Detector
        // Here distance accomplished is compared with the number of pixel steps taken. It should be a
        // Euclidean distance but that involves two multiplies and a square root Instead the larger of the
        // the dimensions is taken as the accomplished distance Even if all four extents have been pushed
        // out, eventually the ratio gets bad enough to quit. This, then is the second quit detector; the
        // ultimate quit detector. I think it even makes the temporary safety catch unnecessary
        if (extentWidth > extentHeight) extentEfficiency = (float)extentWidth/(cc_count-offsetM);
        else extentEfficiency = (float)extentHeight/(cc_count-offsetM);
        //cout << (cc_count-offsetM) <<" "<< extentEfficieney <<" ";
        if (extentEfficiency < travelEfficiencyMIN_M) {
                done With Edge = TRUE;
                closed Figure = FALSE;
                diagnosticRejectBecauseInefficient++,
                //cout << "rejected, it is too meandering, cc_count "<<(cc_count-offsetM) << endl,
                utilities.markImage(RED, 91, x, y, YES);
        }
} // end if count and modulo
```

It is worth noting (in the first line of code) in the meandering-extent algorithm above, the condition that cc_count modulo 9=0. That means it does something only every nine steps. It works one-ninth as often as the edge detector algorithm (listed below). In order to save processing power and time, most of the sections of code hide within themselves like that. That is, the "if statements" allow leaping through the code most of the time.

In the straight edge detector, the idea is to look for sequences such as 556556556556556 or 32323232323232323 or 777777677777776. The key is that only two numbers show up for a while. In order to find these sequences, two registers are maintained and a test is performed to determine if the next chaincode element is one or the other registered value. If it is neither of the stored numbers (that is no longer straight) the two registers are cleared and the next element becomes one of the new register values.

The straight edge detector algorithm follows:

```
void
FindROIs::straightEdgeDetector(int cc_count,int windingElement // in,
int& partOf_a_Flatspot) {                                       // out
    //local variables
static int sampleOneOK, sampleTwoOK,
static int sampleOneSingleConsecCount, sampleTwoSingleConsecCount;
static int sampOneSingleConsecMaxed = FALSE;
Static int sampTwoSingleConsecMaxed = FALSE;
static int straightSampleTwo, straightSampleOne;
if (cc_count == offsetM)
{// this indicates the edge starts from a point found by start3( )
    sampOneSingleConsecMaxed = FALSE;
    sampTwoSingleConsecMaxed = FALSE,
    straightSampleTwo = 99;
    straightSampleOne = 99,
    partOf_a_Flatspot = FALSE;
}
if (straightSampleOne == 99) {
    straightSampleOne = windingElement;
}
if(straightSampleTwo == 99 && straightSampleOne !=
windingElement) {
    straightSampleTwo = windingElement;
}
if (windingElement==straightSampleOne) {
    sampleOneSingleConsecCount++;
    if (sampleOneSingleConsecCount >= 3)
    sampOneSingleConsecMaxed = TRUE,
    sampleOneOK = TRUE;
}else{
    sampleOneOK = FALSE;
    sampleOneSingleConsecCount = 0;
}
if (windingElement==straightSampleTwo) {
    sampleTwoSingleConsecCount++;
    if (sampleTwoSingleConsecCount >=
    3 && straightSampleOne '= straightSampleTwo)
sampTwoSingleConsecMaxed = TRUE;
// second test might be superfluous
    sampleTwoOK = TRUE;
}else{
    sampleTwoOK = FALSE,
    sampleTwoSingleConsecCount = 0.
}
if(sampleOneOK || sampleTwoOK) {// Heart of the detector
    if(sampOneSingleConsecMaxed && sampTwoSingleConsecMaxed)
    {// if kink; a run of three of both types.
    straightSampleOne = 99; //
    straightSampleTwo = 99; //
        sampOneSingleConsecMaxed = FALSE; // if kink, start over
        also
        sampTwoSingleConsecMaxed FALSE; //
        partOf_a_Flatspot = FALSE;
        //cout<<"kink found at cc_count="<<cc_count<<endl;
        // if (utilities.markImage(BLACK, 1, x, y,
        YES)'=0)cout<<"notStriaght1"<<endl; // shows a kink
    }else{
        partOf_a_Flatspot = TRUE; // STRAIGHT STRAIGHT
        STRAIGHT
    }
}
}
else {// ie not either sample, start over looking for straight segment
    straightSampleOne = windingElement; //<--headstart on next
    line
    // straightSampleOne = 99, //
    straightSampleTwo = 99; //
    sampOneSingleConsecMaxed = FALSE;
    // if not one of two OK directions, start over
    sampTwoSingleConsecMaxed = FALSE; //
    partOf_a_Flatspot = FALSE, //
    if(utilities.markImage(GREEN, 1, x, y,
    YES)!=0)cout<<"notStraight3"<<endl;
    } // this markImage shows heginning of new straight
}// end straightEdge Detector( )/////////////////////////////
```

As described above, the motion of the path-chaincode is described within a few lines of code; the innermost part within the double "do" loop. Practically any number or type of detectors can be located just outside this inner loop. And any amount of sophistication can be included there as long as additional loops are avoided. Therefore, target identification can be accomplished quickly, without wasting processing power. For example, even with all detectors working simultaneously, images as large as 256×1,800 can be screened in approximately 0.25 seconds or less. Normal size (256 square) images were done in real time. A list of different types of detectors contemplated for use with various embodiments of the present invention follows:

changes in (the first derivative of) the Sobel direction at each point on the edge.

the actual value of the direction of the Sobel at each point on the edge the width, or the change in the width of the blurring on the edge length of a straight edge before it encounters another edge going a different direction length of a straight edge before it turns by a certain amount perimeter of a curving edge divided by the number of pixels encountered before it comes on itself; forms a closed curve extent (up/down and left/right) of a contour that is somewhat closed area of the somewhat closed contour contrast across the edge of a somewhat closed contour the consistency of the contrast of the edge of a somewhat closed contour the consistency of the width of the edge of a somewhat closed contour This is not an exhaustive list and in a real application, only a few, a suite, of these detectors would be chosen.

The most effective region-of-interest-detector is one that selects the best combination of the detectors above, and does not impose a great time penalty. For example, the detectors above that have to do with the Sobel direction of the edge at a point involve a multiply, a trig function and float values in a nine step double loop. Those are among the slowest detectors which, if used, must be something of a post screener and not within the path-chaincode follower. The fastest detectors typically involve the extent of the chaincode and limits on the path direction.

The slowest chaincode algorithms are those that involve the Sobel. After the number of edges have been screened to about a dozen per image, these can be retraced by using a chaincode follower which has been converted to a reader. While the pixel values are being retraced, the Sobel is taken to get the edge direction and magnitude. The algorithm used to find the direction and magnitude at each edge point is listed below:

```
Source Code for obtaining the direction and magnitude of the edge a point
void getSobelDirectinAndWidth(short int*Image, short int*header, int row, int col, int contrast, float sobelVector[2])
//                            in,          in,           in,     in,      in,                out
    float mag,
    int i,j;
    int Hsum = 0;
    int Vsum = 0;
    int tempInt;
    int hSob[3][3] = {{-1,-2,-1}, {0,0,0}, {1,2,1}},
    int vSob[3][3] = {{-1,0,1}, {-2,0,2}, {-1,0,1}};
//      H Sobel -1 -2 -1    V Sobel -1 0 +1        index 0,0 0,1 0,2
//              0  0  0             -2 0 +2              1,0 1,1 1,2
//             +1 +2 +1             -1 0 +1              2,0 2,1 2,2
// prototypes
// short int getGrey(short int, short int, int, int);
// int getCootrast(int);
// horizontal Sobel
    for (i=-1;i<2; i++) // <--moving down
        for (j=-1;j<2;j++) { // <--moving across
            Hsum += hSob[i+1]*getGrey(image, header, (row+i),(col+j)),
        }
// vertical Sobel
    for (i=-1;i<2i++) // <--moving down
        for (j=-1;j<2;j++) { // <--moving across
            Vsum += vSob[i+1]*getGrey(image, header, (row+i), (col+j));
        }
        tempInt = Hsum*Hsum + Vsum*Vsum,
        mag = (float)sqrt(tempInt)/4.0;
        sobelVector[DIR] = (float)atan2(Vsum,Hsum);
        sobelVector[MAG] = (float)contrast/mag;
}// end getSobelDirectionAndWidth( )
```

The teachings of the present invention have been illustrated with regard to the target recognition industry. However, it should be recognized that the methods and systems described herein may be used for any application where a two-dimensional image is analyzed in order to identify objects of a particular shape or contour.

Although the present invention has been described in detail, it should be understood that various changes, substitutions, and alterations may be readily ascertainable by those skilled in the art and may be made herein without departing from the spirit and scope of the present invention as defined by the following claims.

What is claimed is:

1. A method for analyzing an image, comprising:
   selecting an initial location within an image to initiate a chaincode;
   initiating the chaincode at the initial location, the chaincode being operable to follow a path defined, at least in part, by a plurality of adjacent pixels having approximately equal changes in brightness therebetween;
   measuring direction changes of the path; and
   calculating meander values corresponding to successive positions of the chaincode as a chaincode follower progresses along the path, wherein the meander values are related to the proportion of traversed pixels with respect to a straight-line distance traveled by the chaincode from an initial point.

2. The method of claim 1, further comprising storing a starting point and a history of the direction changes of the path.

3. The method of claim 1, further comprising:
   terminating the chaincode if one of the meander values exceeds a predetermined threshold meander value.

4. The method of claim 1, wherein the path includes at least a first limit of extent which is approximately parallel to a reference axis, wherein a length of the first limit of extent is determined by a first point at which the chaincode follower is no longer extending in a direction of the first limit of extent.

5. The method of claim 4, wherein:
   the path includes at least a second limit of extent which extends approximately perpendicular to the reference axis;
   a length of the second limit of extent is determined by a second point at which the chaincode follower is no longer extending in a direction of the first limit of extent; and
   the first and second limits of extent at least partially defining a contour.

6. The method of claim 1, further comprising:
   identifying portions of the chaincode that include contiguous points that do not deviate by more than one least significant bit of a chaincode range; and
   recording straight segments for further analysis of straightness.

7. The method of claim 5, wherein the contour is an edge with at least first and second limits of extent, and further comprising:
   calculating an approximate area of the contour defined, at least in part, by the first and second limits of extent, using x, y locations of the first and second limits of extent.

8. The method of claim 4, further comprising identifying generally straight edges which occur within a region defined by the contour as being a location of a target candidate.

9. The method of claim 1, wherein selecting the location to initiate the chaincode comprises:
   selecting a first seed point within the image;
   analyzing a first linear segment which extends from the first seed point, the first linear segment including a plurality of pixels of the image;
   detecting changes in brightness between successive ones of the plurality of pixels of the image;

identifying first and second adjacent pixels, of the plurality of pixels, having a change in brightness therebetween which exceeds a predetermined threshold change in brightness; and wherein the location is selected proximate the first and second pixels.

10. The method of claim 9, wherein selecting the location to initiate the chaincode further comprises:

identifying two of the successive pixels having the greatest change in brightness therebetween; and wherein the first and second adjacent pixels comprise the two of the successive pixels.

11. The method of claim 9, wherein selecting the location to initiate the chaincode further comprises:

selecting a grid of seed points within the image, the grid of seed points including the first seed point;

analyzing a plurality of linear segments along the image, each linear segment initiating at, and extending away from, a respective one of the grid of seed points;

wherein the plurality of linear segments includes the first linear segment;

for each of the plurality of linear segments, identifying a pair of adjacent pixels having the greatest change in brightness;

wherein the first and second adjacent pixels comprise one of the pairs of adjacent pixels; and initiating chaincodes proximate each of the pairs of adjacent pixels.

12. The method of claim 1, wherein the path of the chaincode at least partially defines a contour and further comprising:

measuring an approximate area of the contour;

comparing the area with a range of acceptable area values; and performing a second level of evaluation of the contour, if the area is within the range of acceptable area values.

13. The method of claim 1, further comprising terminating the chaincode if the chaincode demonstrates singularity such that the chaincode returns to an identical pixel, in one step.

14. The method of claim 1, further comprising measuring a plurality of edge directions along the path, wherein the edge directions are determined by a ratio of adjacent gray values.

15. The method of claim 14, further comprising calculating, for an edge segment, a deviation from a mean of the plurality of edge directions to obtain a measure of a degree of straightness of the edge segment.

16. The method of claim 15, further comprising:

detecting a plurality of generally straight edges of the path, clustered in a region of the image;

calculating a centroid of a contour defined, at least in part, by the plurality of generally straight edges; and identifying the centroid as a target candidate.

17. The method of claim 15, further comprising: detecting at least one generally straight edge along the path;

determining if the at least one generally straight edge is located within a contour of interest; and identifying the contour as a target candidate.

18. The method of claim 1, wherein the path at least partially defines a contour, and further comprising:

identifying the contour as a target candidate if the path includes a first limit of extent which extends generally parallel to a reference axis, and which is smaller than a predetermined maximum size, and at least a second limit of extent which extends generally perpendicular to the reference axis.

19. A method for analyzing an image, comprising:

initiating chaincodes at a plurality of initial points of an image;

for each chaincode, monitoring a path of the chaincode;

terminating each of the plurality of chaincodes that meanders excessively; and identifying portions of the chaincode that include contiguous points that do not deviate by more than one least significant bit of the chaincode range.

20. The method of claim 19, further comprising:

for each chaincode, storing the initial points and directional changes until the chaincode is terminated; and for each chaincode that meets certain predefined target candidate criteria, passing the initial points and directional changes along to a second level of evaluation.

21. A method for analyzing an image, comprising:

initiating chaincodes at a plurality of edge points of an image;

for each chaincode, monitoring a path of the chaincode;

identifying portions of the chaincode that include contiguous points that do not deviate by more than one least significant bit of the chaincode range; and terminating any of the plurality of chaincodes having a straight-line distance that exceeds a predetermined maximum length.

22. The method of claim 21, further comprising:

for each chaincode, storing a starting point and a history of directional changes until the chaincode is terminated; and for each chaincode that meets certain predefined target candidate criteria, passing the starting point and history of directional changes along to a second level of evaluation.

23. The method of claim 21, further comprising:

monitoring a plurality of extents associated with each chaincode;

wherein the plurality of extents of each chaincode at least partially define an associated contour of each chaincode;

for each chaincode, continuously calculating an approximate area of the associated contour as the chaincode extends along the path; and terminating any of the plurality of chaincodes having an associated contour that exceeds a predetermined maximum area.

24. The method of claim 21, further comprising recording the portions for further analysis of straightness.

25. The method of claim 24, further comprising:

identifying generally straight edges which occur within a region defined by an appropriate size contour as being a location of a target candidate.

26. The method of claim 21, further comprising measuring a plurality of edge directions along the path, wherein the directions are determined by a ratio of adjacent gray values.

27. The method of claim 26, further comprising calculating, for an edge segment, a deviation from a mean of the plurality of edge directions to obtain a measure of degree of straightness of the edge segment.

* * * * *